US011809363B1

(12) United States Patent
De et al.

(10) Patent No.: US 11,809,363 B1
(45) Date of Patent: Nov. 7, 2023

(54) DEBUG METHODOLOGY FOR A USB SUB-SYSTEM USING UNIQUE IDENTIFIER (UID) APPROACH

(71) Applicant: Synopsys, Inc., Sunnyvale, CA (US)

(72) Inventors: Jishnu De, Ghaziabad (IN); Jaspreet Singh Gambhir, Surrey (CA)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/462,753

(22) Filed: Aug. 31, 2021

Related U.S. Application Data

(60) Provisional application No. 63/072,497, filed on Aug. 31, 2020.

(51) Int. Cl.

| | |
|---|---|
| *G06F 13/42* | (2006.01) |
| *G06F 13/38* | (2006.01) |
| *G06F 12/02* | (2006.01) |
| *G06F 12/06* | (2006.01) |
| *G06F 15/173* | (2006.01) |

(52) U.S. Cl.
CPC ...... *G06F 13/4221* (2013.01); *G06F 12/0246* (2013.01); *G06F 12/0646* (2013.01); *G06F 13/387* (2013.01); *G06F 15/17312* (2013.01)

(58) Field of Classification Search
CPC ............. G06F 12/0246; G06F 12/0646; G06F 13/387; G06F 13/4221; G06F 15/17312
See application file for complete search history.

(56) References Cited

U.S. PATENT DOCUMENTS 8,024,171 B1 * 9/2011 Korolev ................ G06F 11/366 703/24
2006/0123129 A1 * 6/2006 Toebes .................. H04L 67/565 709/230
2009/0106741 A1 * 4/2009 Dageville ........... G06F 11/3636 717/128
2015/0046617 A1 * 2/2015 Shirlen ............... G06F 11/3466 710/117
2018/0189222 A1 * 7/2018 Srivastava ............ G06F 13/287
2019/0332558 A1 * 10/2019 Goel ....................... H04L 47/41
2019/0335351 A1 * 10/2019 Hui ........................ H04W 24/08
2020/0192832 A1 * 6/2020 Regupathy .......... G06F 13/1668
2021/0055777 A1 * 2/2021 Regupathy .............. G06F 1/266

* cited by examiner

*Primary Examiner* — Eric T Oberly
(74) *Attorney, Agent, or Firm* — Lewis Roca Rothgerber Christie LLP

(57) ABSTRACT

A method for debugging an electronic subsystem is disclosed. The method includes converting a first message in a first protocol format received at a first functional logical block of a plurality of functional logical blocks of an electronic subsystem into a second message in a second protocol format at the first functional logical block, wherein the second message includes a unique identifier (UID), and generating a first trace file corresponding to the first functional logical block, wherein the first trace file includes the UID. The method includes forwarding the second message from the first functional logical block to a second functional logical block. The method includes generating a second trace file corresponding to the second functional logical block, wherein the second trace file includes the UID, and performing an analysis on the first and the second functional logical blocks.

20 Claims, 29 Drawing Sheets

Figure 6:
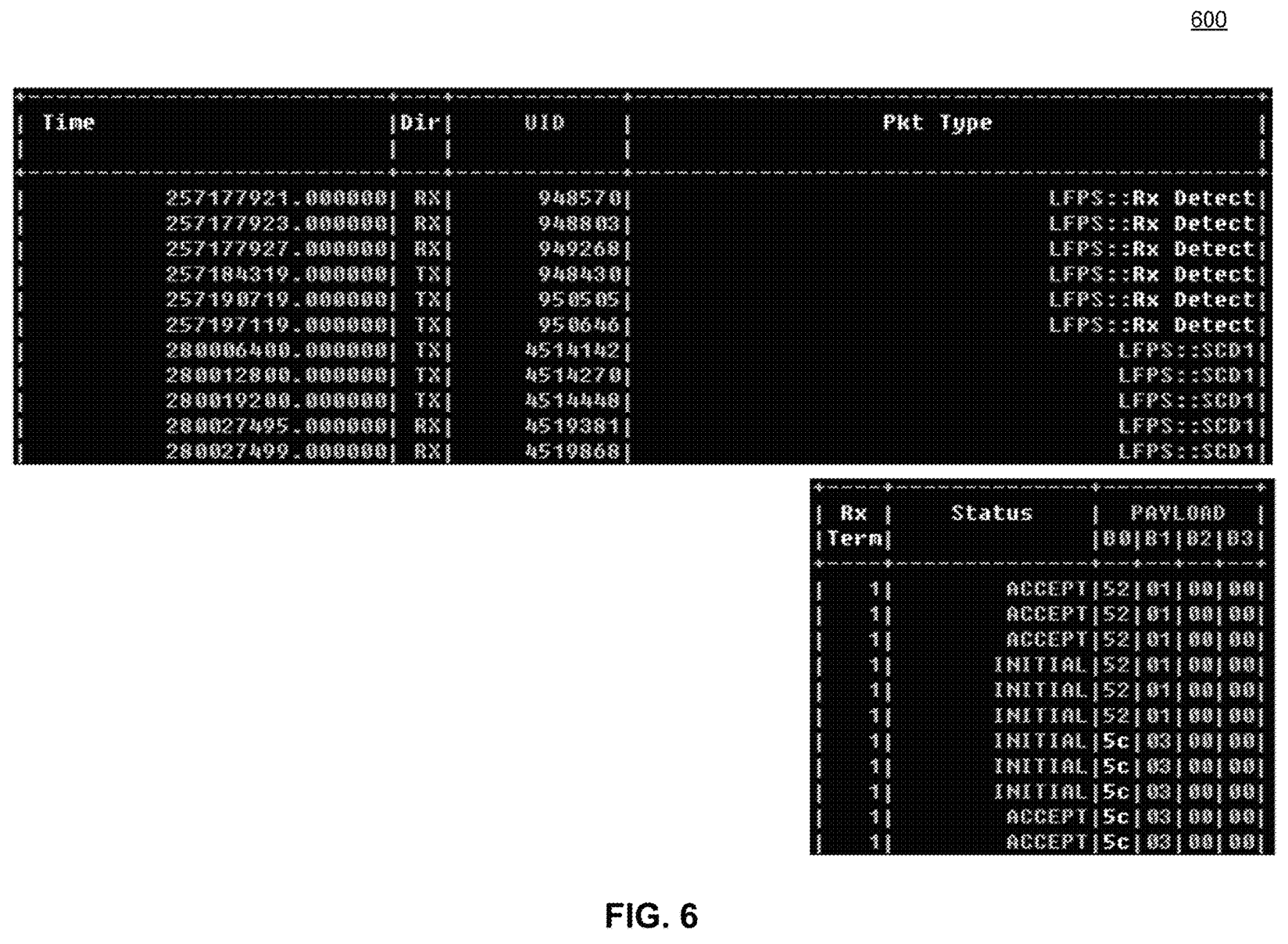

600

| Time | Dir | UID | Pkt Type | Rx Term | Status | PAYLOAD 00 | 01 | 02 | 03 |
|---|---|---|---|---|---|---|---|---|---|
| 257177921.000000 | RX | 948570 | LFPS::Rx Detect | 1 | ACCEPT | 52 | 01 | 00 | 00 |
| 257177923.000000 | RX | 948803 | LFPS::Rx Detect | 1 | ACCEPT | 52 | 01 | 00 | 00 |
| 257177927.000000 | RX | 949268 | LFPS::Rx Detect | 1 | ACCEPT | 52 | 01 | 00 | 00 |
| 257184319.000000 | TX | 948430 | LFPS::Rx Detect | 1 | INITIAL | 52 | 01 | 00 | 00 |
| 257190719.000000 | TX | 950505 | LFPS::Rx Detect | 1 | INITIAL | 52 | 01 | 00 | 00 |
| 257197119.000000 | TX | 950646 | LFPS::Rx Detect | 1 | INITIAL | 52 | 01 | 00 | 00 |
| 280006400.000000 | TX | 4514142 | LFPS::SCD1 | 1 | INITIAL | 5c | 03 | 00 | 00 |
| 280012800.000000 | TX | 4514270 | LFPS::SCD1 | 1 | INITIAL | 5c | 03 | 00 | 00 |
| 280019200.000000 | TX | 4514440 | LFPS::SCD1 | 1 | INITIAL | 5c | 03 | 00 | 00 |
| 280027495.000000 | RX | 4519381 | LFPS::SCD1 | 1 | ACCEPT | 5c | 03 | 00 | 00 |
| 280027499.000000 | RX | 4519868 | LFPS::SCD1 | 1 | ACCEPT | 5c | 03 | 00 | 00 |

| Time | Pkt Type | Activity | UID | Path |
|---|---|---|---|---|
| 0.000000 | ~~ | Start Egress Scheduler | x | P~x |
| 251070787.000000 | ~~ | Egress Path Setup | x | P~0 |
| 281648250.000000 | ~~ | Start Egress Scheduler | x | P~x |
| 281649997.000000 | TUNNELED | Wait Schedule Egress | 4778394 | P~9 |
| 281649997.000000 | TUNNELED | Push Pkt Egress Q | 4778394 | P~9 |
| 281665947.000000 | TUNNELED::USB_LINK_CMD | Wait Schedule Egress | 4781962 | P~8 |
| 281665947.000000 | TUNNELED::USB_LINK_CMD | Push Pkt Egress Q | 4781962 | P~8 |
| 285768293.000000 | TUNNELED::USB_LINK_CMD | Push Pkt Egress Q | 5447693 | P~8 |
| 285830782.000000 | LMP::CR_SYNC | Schedule Credit Sync Pkt | 5458583 | P~8 |
| 285830782.000000 | LMP::CR_SYNC | Egress send LMP/TMU | 5458583 | P~x |
| 285832250.000000 | ~~ | Start Egress Scheduler | x | P~x |
| 285888299.000000 | LMP::CR_GRANT::DCT | Get Credit Grant Pkt | 5470122 | P~0 |

| PCL | PCC | SCL | SCC | QoS | Priority | Weight | Egress Buffer | Curr W | Q State | EgressQ |
|---|---|---|---|---|---|---|---|---|---|---|
| x | x | x | x | ~~ | x | x | x (x) | x | XX | XX |
| 0 | 0 | x | x | Dedicated | 0 | 1 | x (x) | x | XX | STALL |
| x | x | x | x | ~~ | x | x | x (x) | x | XX | XX |
| x | x | x | x | ~~ | x | x | 0 (5) | x | OPEN | XX |
| x | x | x | x | ~~ | x | x | 1 (5) | x | OPEN | XX |
| x | x | x | x | ~~ | x | x | 2 (5) | x | OPEN | XX |
| x | x | x | x | ~~ | x | x | 3 (5) | x | OPEN | XX |
| x | x | x | x | ~~ | x | x | 4 (5) | x | OPEN | XX |
| 67 | 67 | x | x | ~~ | x | x | x (x) | x | XX | XX |
| x | x | x | x | ~~ | x | x | x (x) | x | XX | XX |
| x | x | x | x | ~~ | x | x | x (x) | x | XX | XX |
| 131 | 67 | x | x | ~~ | x | x | x (x) | x | XX | SEND |

Figure 10:
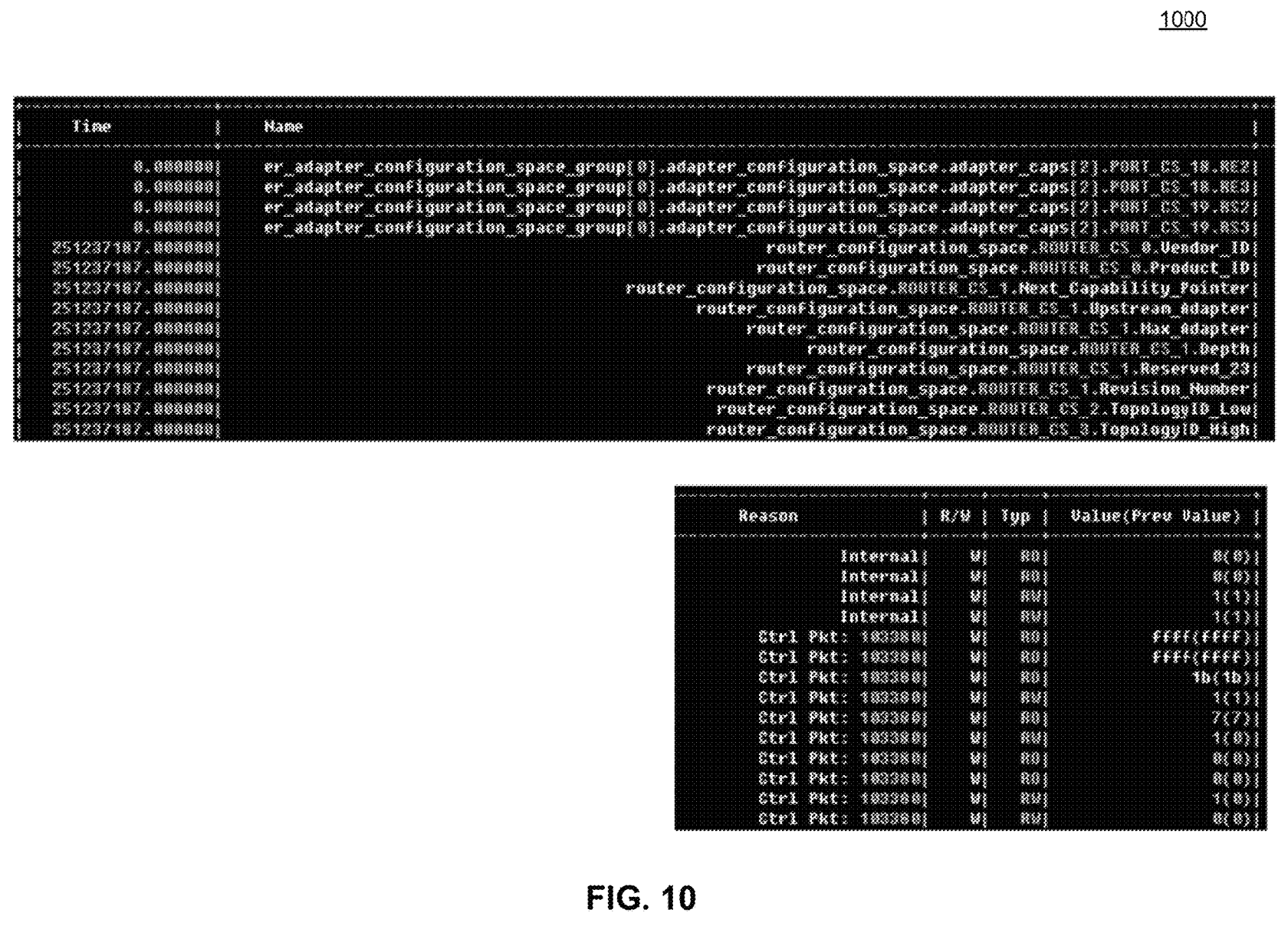

| Time | Name |
|---|---|
| 0.000000 | er_adapter_configuration_space_group[0].adapter_configuration_space.adapter_caps[2].PORT_CS_18.RE2 |
| 0.000000 | er_adapter_configuration_space_group[0].adapter_configuration_space.adapter_caps[2].PORT_CS_18.RE3 |
| 0.000000 | er_adapter_configuration_space_group[0].adapter_configuration_space.adapter_caps[2].PORT_CS_19.RS2 |
| 0.000000 | er_adapter_configuration_space_group[0].adapter_configuration_space.adapter_caps[2].PORT_CS_19.RS3 |
| 251237187.000000 | router_configuration_space.ROUTER_CS_0.Vendor_ID |
| 251237187.000000 | router_configuration_space.ROUTER_CS_0.Product_ID |
| 251237187.000000 | router_configuration_space.ROUTER_CS_1.Next_Capability_Pointer |
| 251237187.000000 | router_configuration_space.ROUTER_CS_1.Upstream_Adapter |
| 251237187.000000 | router_configuration_space.ROUTER_CS_1.Max_Adapter |
| 251237187.000000 | router_configuration_space.ROUTER_CS_1.Depth |
| 251237187.000000 | router_configuration_space.ROUTER_CS_1.Reserved_23 |
| 251237187.000000 | router_configuration_space.ROUTER_CS_1.Revision_Number |
| 251237187.000000 | router_configuration_space.ROUTER_CS_2.TopologyID_Low |
| 251237187.000000 | router_configuration_space.ROUTER_CS_3.TopologyID_High |

| Reason | R/W | Typ | Value(Prev Value) |
|---|---|---|---|
| Internal | W | RO | 0(0) |
| Internal | W | RO | 0(0) |
| Internal | W | RW | 1(1) |
| Internal | W | RW | 1(1) |
| Ctrl Pkt: 103380 | W | RO | ffff(ffff) |
| Ctrl Pkt: 103380 | W | RO | ffff(ffff) |
| Ctrl Pkt: 103380 | W | RO | 1b(1b) |
| Ctrl Pkt: 103380 | W | RW | 1(1) |
| Ctrl Pkt: 103380 | W | RO | 7(7) |
| Ctrl Pkt: 103380 | W | RW | 1(0) |
| Ctrl Pkt: 103380 | W | RO | 0(0) |
| Ctrl Pkt: 103380 | W | RO | 0(0) |
| Ctrl Pkt: 103380 | W | RW | 1(0) |
| Ctrl Pkt: 103380 | W | RW | 0(0) |

| Dir | Start Time | End Time | UID | Packet Type |
|---|---|---|---|---|
| TX | 251078787.000ps | 251078787.000ps | 83870 | LMP::CREDIT_GRANT |
| TX | 251160250.000ps | 251160250.000ps | 91836 | LMP::CREDIT_GRANT |
| TX | 251163450.000ps | 251163450.000ps | 91840 | CONTROL::READ_RESPONSE |
| TX | 251238650.000ps | 251238650.000ps | 103415 | LMP::CREDIT_GRANT |
| TX | 251241850.000ps | 251241850.000ps | 103419 | CONTROL::WRITE_RESPONSE |
| TX | 251248250.000ps | 251248250.000ps | 83830 | CONTROL::HOT_PLUG_EVENT |
| TX | 251318650.000ps | 251318650.000ps | 114307 | LMP::CREDIT_GRANT |
| TX | 251321850.000ps | 251321850.000ps | 114635 | LMP::CREDIT_GRANT |
| TX | 251325050.000ps | 251325050.000ps | 114311 | CONTROL::READ_RESPONSE |
| TX | 251337850.000ps | 251337850.000ps | 83838 | CONTROL::HOT_PLUG_EVENT |

| Status | HopId | Pdf | SuppId | HEC | Len | LMP Sub Heading | | | |
|---|---|---|---|---|---|---|---|---|---|
| | | | | | | ECC | Credit | HopID | L |
| ACCEPT | 1 | 1 | 0 | fe | 4 | e | 2 | 0 | 0 |
| ACCEPT | 1 | 1 | 0 | fe | 4 | 9 | 3 | 0 | 0 |
| ACCEPT | 0 | 1 | 0 | 7b | 52 | x | x | x | x |
| ACCEPT | 1 | 1 | 0 | fe | 4 | 1c | 4 | 0 | 0 |
| ACCEPT | 0 | 2 | 0 | 66 | 16 | x | x | x | x |
| ACCEPT | 0 | 5 | 0 | 01 | 16 | x | x | x | x |
| ACCEPT | 1 | 1 | 0 | fe | 4 | 1b | 5 | 0 | 0 |
| ACCEPT | 1 | 1 | 0 | fe | 4 | 12 | 6 | 0 | 0 |
| ACCEPT | 0 | 1 | 0 | 7b | 52 | x | x | x | x |
| ACCEPT | 0 | 5 | 0 | 01 | 16 | x | x | x | x |

Figure 12:
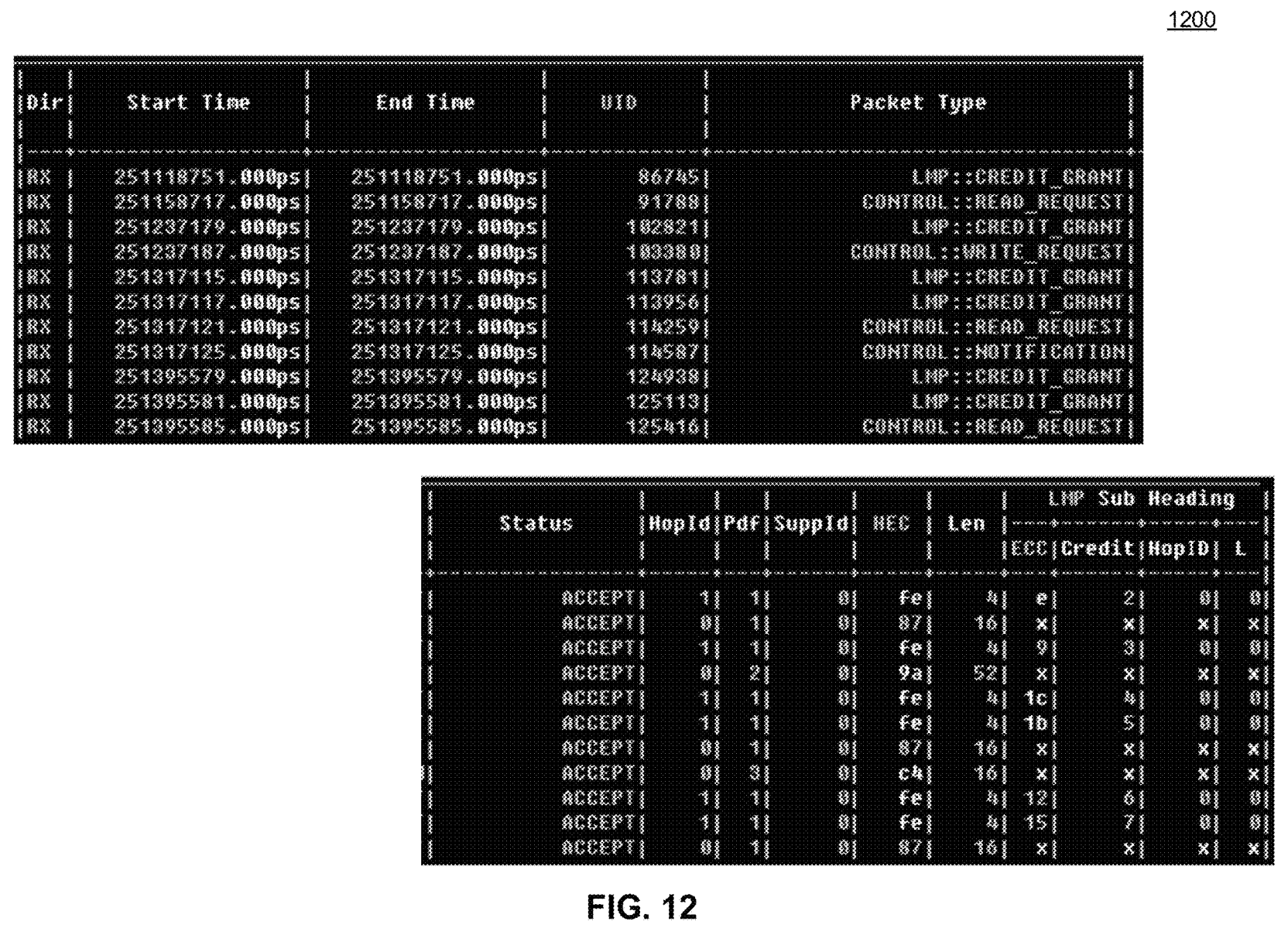

| Dir | Start Time | End Time | UID | Packet Type |
|---|---|---|---|---|
| RX | 251118751.000ps | 251118751.000ps | 86745 | LMP::CREDIT_GRANT |
| RX | 251158717.000ps | 251158717.000ps | 91788 | CONTROL::READ_REQUEST |
| RX | 251237179.000ps | 251237179.000ps | 102821 | LMP::CREDIT_GRANT |
| RX | 251237187.000ps | 251237187.000ps | 103380 | CONTROL::WRITE_REQUEST |
| RX | 251317115.000ps | 251317115.000ps | 113781 | LMP::CREDIT_GRANT |
| RX | 251317117.000ps | 251317117.000ps | 113956 | LMP::CREDIT_GRANT |
| RX | 251317121.000ps | 251317121.000ps | 114259 | CONTROL::READ_REQUEST |
| RX | 251317125.000ps | 251317125.000ps | 114587 | CONTROL::NOTIFICATION |
| RX | 251395579.000ps | 251395579.000ps | 124938 | LMP::CREDIT_GRANT |
| RX | 251395581.000ps | 251395581.000ps | 125113 | LMP::CREDIT_GRANT |
| RX | 251395585.000ps | 251395585.000ps | 125416 | CONTROL::READ_REQUEST |

| Status | HopId | Pdf | SuppId | HEC | Len | LMP Sub Heading | | | |
|---|---|---|---|---|---|---|---|---|---|
| | | | | | | ECC | Credit | HopID | L |
| ACCEPT | 1 | 1 | 0 | fe | 4 | e | 2 | 0 | 0 |
| ACCEPT | 0 | 1 | 0 | 87 | 16 | x | x | x | x |
| ACCEPT | 1 | 1 | 0 | fe | 4 | 9 | 3 | 0 | 0 |
| ACCEPT | 0 | 2 | 0 | 9a | 52 | x | x | x | x |
| ACCEPT | 1 | 1 | 0 | fe | 4 | 1c | 4 | 0 | 0 |
| ACCEPT | 1 | 1 | 0 | fe | 4 | 1b | 5 | 0 | 0 |
| ACCEPT | 0 | 1 | 0 | 87 | 16 | x | x | x | x |
| ACCEPT | 0 | 3 | 0 | c4 | 16 | x | x | x | x |
| ACCEPT | 1 | 1 | 0 | fe | 4 | 12 | 6 | 0 | 0 |
| ACCEPT | 1 | 1 | 0 | fe | 4 | 15 | 7 | 0 | 0 |
| ACCEPT | 0 | 1 | 0 | 87 | 16 | x | x | x | x |

Figure 15:
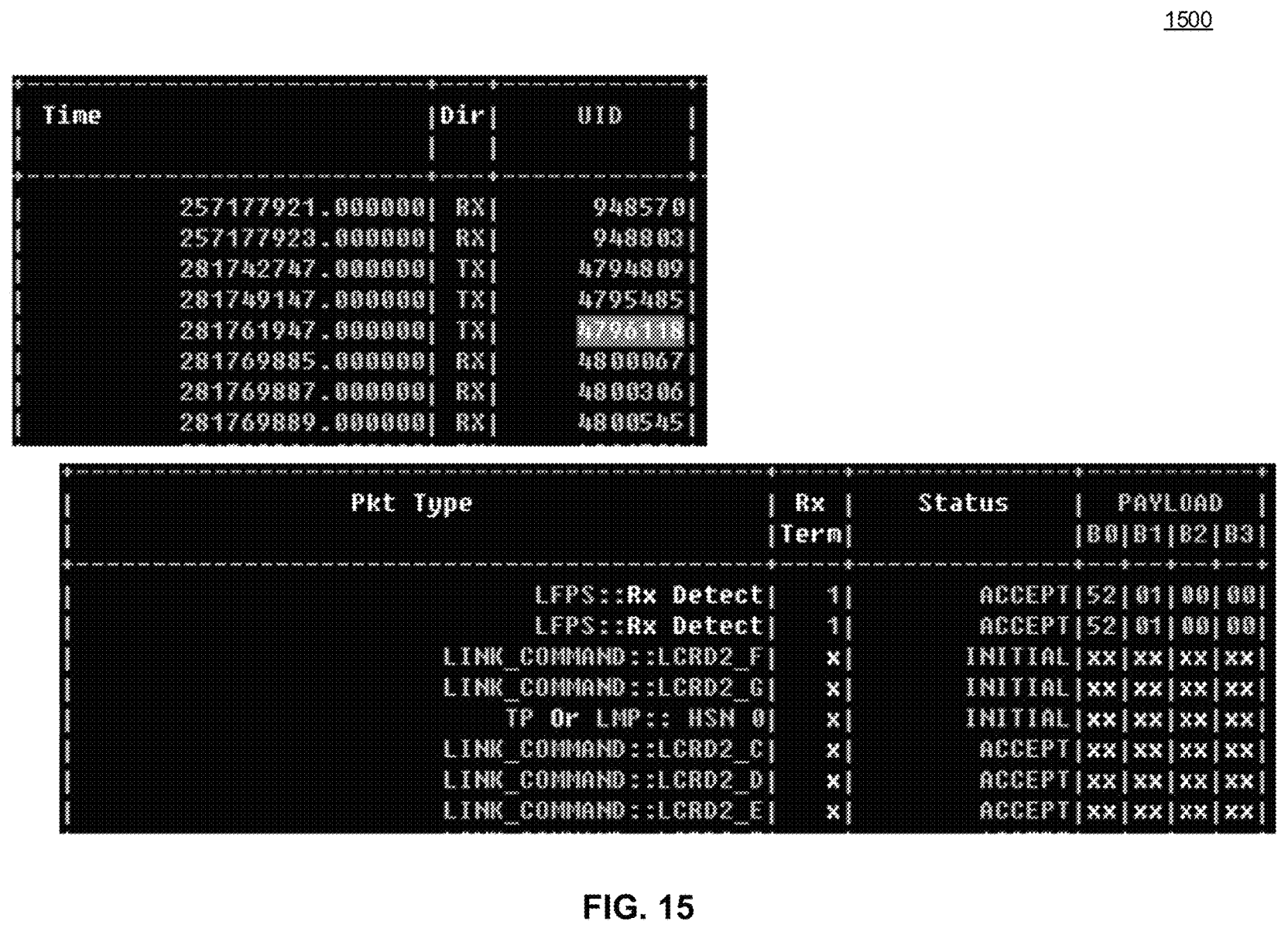

| Time | Dir | UID |
|---|---|---|
| 257177921.000000 | RX | 948570 |
| 257177923.000000 | RX | 948803 |
| 281742747.000000 | TX | 4794809 |
| 281749147.000000 | TX | 4795485 |
| 281761947.000000 | TX | 4796118 |
| 281769885.000000 | RX | 4800067 |
| 281769887.000000 | RX | 4800306 |
| 281769889.000000 | RX | 4800545 |

| Pkt Type | Rx Term | Status | PAYLOAD B0 | B1 | B2 | B3 |
|---|---|---|---|---|---|---|
| LFPS::Rx Detect | 1 | ACCEPT | 52 | 01 | 00 | 00 |
| LFPS::Rx Detect | 1 | ACCEPT | 52 | 01 | 00 | 00 |
| LINK_COMMAND::LCRD2_F | x | INITIAL | xx | xx | xx | xx |
| LINK_COMMAND::LCRD2_G | x | INITIAL | xx | xx | xx | xx |
| TP Or LMP:: HSN 0 | x | INITIAL | xx | xx | xx | xx |
| LINK_COMMAND::LCRD2_C | x | ACCEPT | xx | xx | xx | xx |
| LINK_COMMAND::LCRD2_D | x | ACCEPT | xx | xx | xx | xx |
| LINK_COMMAND::LCRD2_E | x | ACCEPT | xx | xx | xx | xx |

Figure 16:
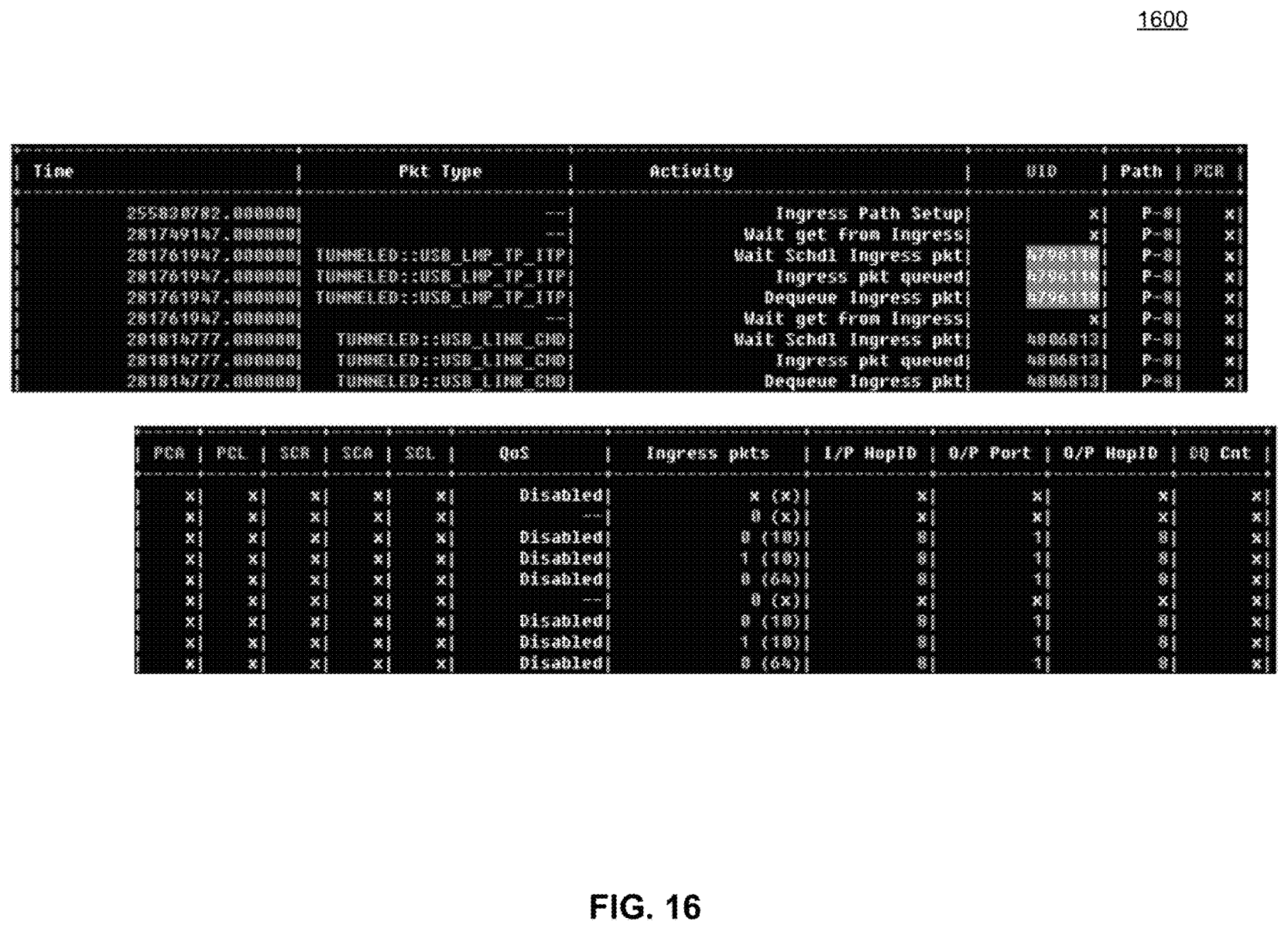

| Time | Pkt Type | Activity | UID | Path | PCR |
|---|---|---|---|---|---|
| 255830782.000000 | -- | Ingress Path Setup | x | P-8 | x |
| 281749147.000000 | -- | Wait get from Ingress | x | P-8 | x |
| 281761947.000000 | TUNNELED::USB_LMP_TP_ITP | Wait Schdl Ingress pkt | [illegible] | P-8 | x |
| 281761947.000000 | TUNNELED::USB_LMP_TP_ITP | Ingress pkt queued | [illegible] | P-8 | x |
| 281761947.000000 | TUNNELED::USB_LMP_TP_ITP | Dequeue Ingress pkt | [illegible] | P-8 | x |
| 281761947.000000 | -- | Wait get from Ingress | x | P-8 | x |
| 281814777.000000 | TUNNELED::USB_LINK_CMD | Wait Schdl Ingress pkt | 4806813 | P-8 | x |
| 281814777.000000 | TUNNELED::USB_LINK_CMD | Ingress pkt queued | 4806813 | P-8 | x |
| 281814777.000000 | TUNNELED::USB_LINK_CMD | Dequeue Ingress pkt | 4806813 | P-8 | x |

| PCA | PCL | SCR | SCA | SCL | QoS | Ingress pkts | I/P HopID | O/P Port | O/P HopID | EQ Cnt |
|---|---|---|---|---|---|---|---|---|---|---|
| x | x | x | x | x | Disabled | x (x) | x | x | x | x |
| x | x | x | x | x | -- | 0 (x) | x | x | x | x |
| x | x | x | x | x | Disabled | 0 (10) | 8 | 1 | 8 | x |
| x | x | x | x | x | Disabled | 1 (10) | 8 | 1 | 8 | x |
| x | x | x | x | x | Disabled | 0 (64) | 8 | 1 | 8 | x |
| x | x | x | x | x | -- | 0 (x) | x | x | x | x |
| x | x | x | x | x | Disabled | 0 (10) | 8 | 1 | 8 | x |
| x | x | x | x | x | Disabled | 1 (10) | 8 | 1 | 8 | x |
| x | x | x | x | x | Disabled | 0 (64) | 8 | 1 | 8 | x |

Figure 17:
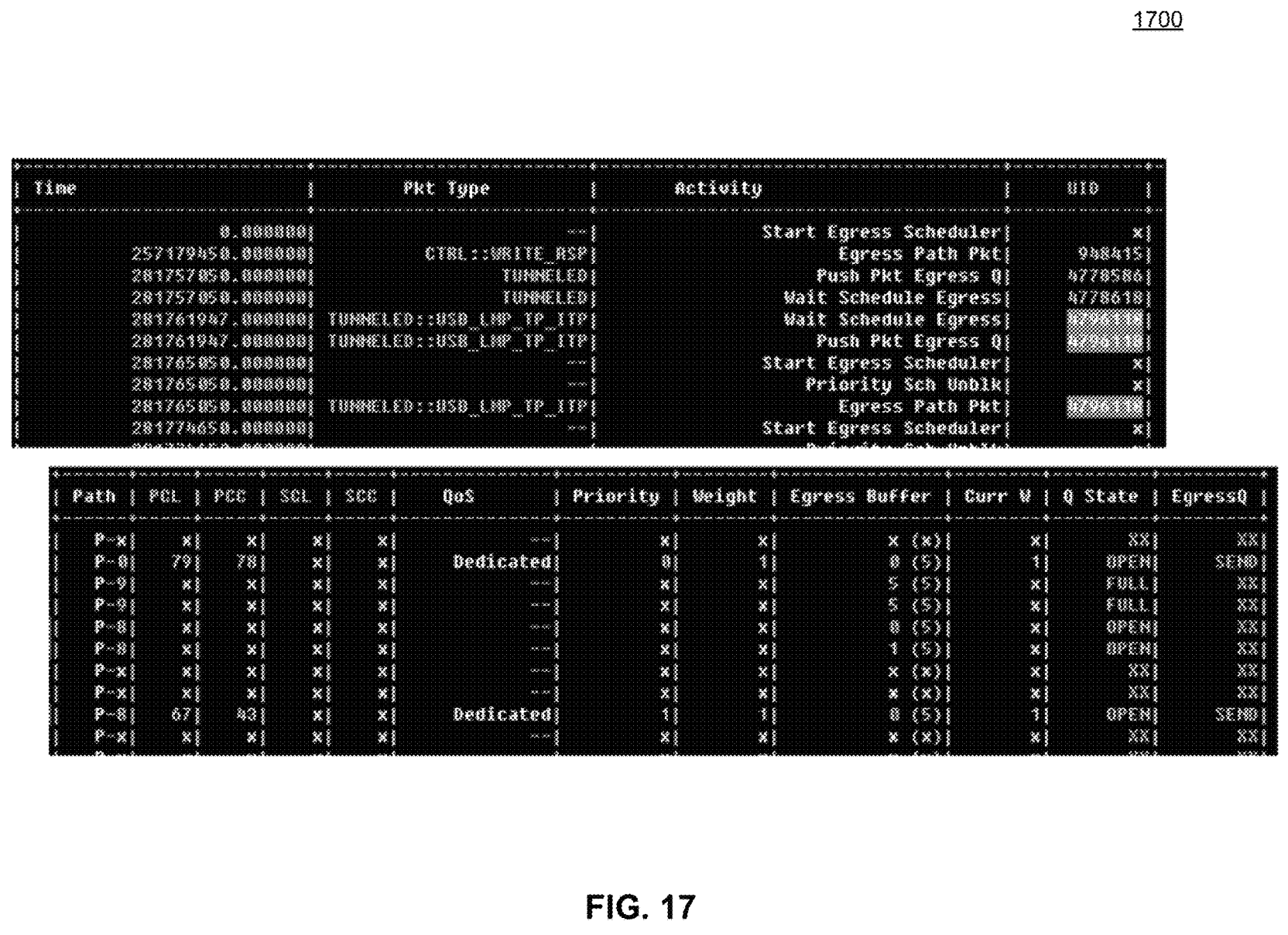

| Time | Pkt Type | Activity | UID |
|---|---|---|---|
| 0.000000 | -- | Start Egress Scheduler | x |
| 257179450.000000 | CTRL::WRITE_RSP | Egress Path Pkt | 988415 |
| 281757050.000000 | TUNNELED | Push Pkt Egress Q | 4778586 |
| 281757050.000000 | TUNNELED | Wait Schedule Egress | 4778618 |
| 281761947.000000 | TUNNELED::USB_LMP_TP_ITP | Wait Schedule Egress | [illegible] |
| 281761947.000000 | TUNNELED::USB_LMP_TP_ITP | Push Pkt Egress Q | [illegible] |
| 281765050.000000 | -- | Start Egress Scheduler | x |
| 281765050.000000 | -- | Priority Sch Unblk | x |
| 281765050.000000 | TUNNELED::USB_LMP_TP_ITP | Egress Path Pkt | [illegible] |
| 281774650.000000 | -- | Start Egress Scheduler | x |

| Path | PCL | PCC | SCL | SCC | QoS | Priority | Weight | Egress Buffer | Curr W | Q State | EgressQ |
|---|---|---|---|---|---|---|---|---|---|---|---|
| P-x | x | x | x | x | -- | x | x | x (x) | x | XX | XX |
| P-8 | 79 | 78 | x | x | Dedicated | 8 | 1 | 0 (5) | 1 | OPEN | SEND |
| P-9 | x | x | x | x | -- | x | x | 5 (5) | x | FULL | XX |
| P-9 | x | x | x | x | -- | x | x | 5 (5) | x | FULL | XX |
| P-8 | x | x | x | x | -- | x | x | 0 (5) | x | OPEN | XX |
| P-8 | x | x | x | x | -- | x | x | 1 (5) | x | OPEN | XX |
| P-x | x | x | x | x | -- | x | x | x (x) | x | XX | XX |
| P-x | x | x | x | x | -- | x | x | x (x) | x | XX | XX |
| P-8 | 67 | 43 | x | x | Dedicated | 1 | 1 | 0 (5) | 1 | OPEN | SEND |
| P-x | x | x | x | x | -- | x | x | x (x) | x | XX | XX |

Figure 18:
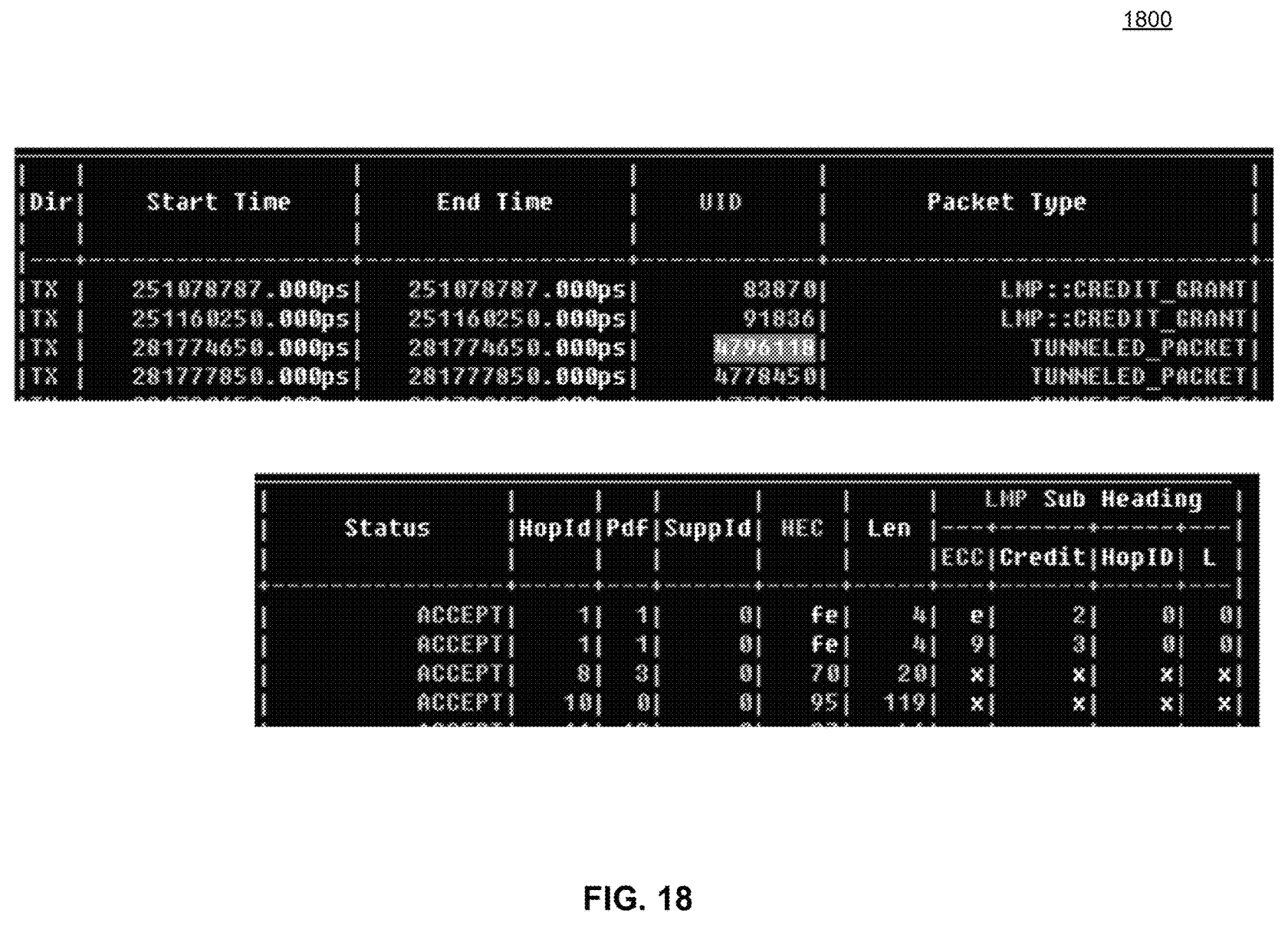

| Dir | Start Time | End Time | UID | Packet Type |
|---|---|---|---|---|
| TX | 251078787.000ps | 251078787.000ps | 83870 | LMP::CREDIT_GRANT |
| TX | 251160250.000ps | 251160250.000ps | 91836 | LMP::CREDIT_GRANT |
| TX | 281774650.000ps | 281774650.000ps | 4796118 | TUNNELED_PACKET |
| TX | 281777850.000ps | 281777850.000ps | 4778450 | TUNNELED_PACKET |

| Status | HopId | Pdf | SuppId | HEC | Len | LMP Sub Heading | | | |
|---|---|---|---|---|---|---|---|---|---|
| | | | | | | ECC | Credit | HopID | L |
| ACCEPT | 1 | 1 | 0 | fe | 4 | e | 2 | 0 | 0 |
| ACCEPT | 1 | 1 | 0 | fe | 4 | 9 | 3 | 0 | 0 |
| ACCEPT | 8 | 3 | 0 | 70 | 20 | x | x | x | x |
| ACCEPT | 10 | 0 | 0 | 95 | 119 | x | x | x | x |

Figure 20:
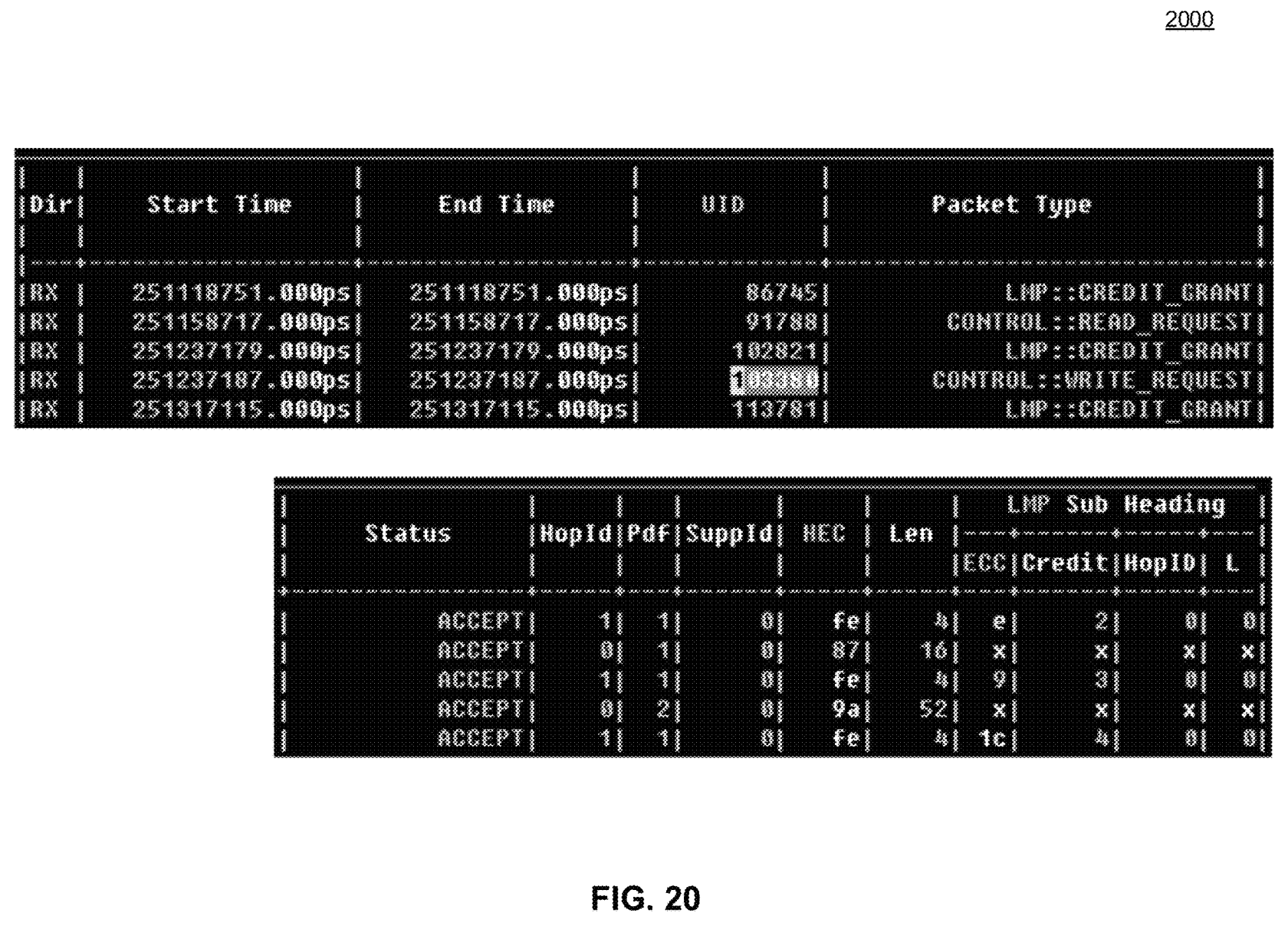

| Dir | Start Time | End Time | UID | Packet Type |
|---|---|---|---|---|
| RX | 251118751.000ps | 251118751.000ps | 86745 | LMP::CREDIT_GRANT |
| RX | 251158717.000ps | 251158717.000ps | 91788 | CONTROL::READ_REQUEST |
| RX | 251237179.000ps | 251237179.000ps | 102821 | LMP::CREDIT_GRANT |
| RX | 251237187.000ps | 251237187.000ps | 1[illegible] | CONTROL::WRITE_REQUEST |
| RX | 251317115.000ps | 251317115.000ps | 113781 | LMP::CREDIT_GRANT |

| Status | HopId | Pdf | SuppId | HEC | Len | LMP Sub Heading | | | |
|---|---|---|---|---|---|---|---|---|---|
| | | | | | | ECC | Credit | HopID | L |
| ACCEPT | 1 | 1 | 0 | fe | 4 | e | 2 | 0 | 0 |
| ACCEPT | 0 | 1 | 0 | 87 | 16 | x | x | x | x |
| ACCEPT | 1 | 1 | 0 | fe | 4 | 9 | 3 | 0 | 0 |
| ACCEPT | 0 | 2 | 0 | 9a | 52 | x | x | x | x |
| ACCEPT | 1 | 1 | 0 | fe | 4 | 1c | 4 | 0 | 0 |

| Time | Pkt Type | Activity | UID | Path |
|---|---|---|---|---|
| 251878787.000000 | --- | Ingress Path Setup | x | P-0 |
| 251878787.000000 | LMP::CR_GRANT::DCT | Send CG- Initial setup | 83870 | P-0 |
| 251878787.000000 | --- | Wait get from Ingress | x | P-0 |
| 251237179.000000 | LMP::CR_GRANT::DCT | Received Credit Grant | 102821 | P-0 |
| 251237187.000000 | CTRL::WRITE_REQ | Wait Schdl Ingress pkt | [illegible] | P-0 |
| 251237187.000000 | CTRL::WRITE_REQ | Ingress pkt queued | [illegible] | P-0 |
| 251237187.000000 | CTRL::WRITE_REQ | Dequeue Ingress pkt | [illegible] | P-0 |
| 251237187.000000 | LMP::CR_GRANT::DCT | Send CG- dequeue cnt expired | 103415 | P-0 |

| PCR | PCA | PCL | SCR | SCA | SCL | QoS | Ingress pkts | I/P HopID | O/P Port | O/P HopID | DQ Cnt |
|---|---|---|---|---|---|---|---|---|---|---|---|
| 0 | 2 | 0 | x | x | x | Dedicated | x (x) | x | x | x | x |
| 0 | 2 | 0 | x | x | x | --- | x (x) | x | x | x | x |
| x | x | x | x | x | x | --- | 0 (x) | x | x | x | x |
| x | x | x | x | x | x | --- | x (x) | x | x | x | x |
| 1 | 3 | 3 | x | x | x | Dedicated | 0 (2) | 0 | 0 | 0 | 1 |
| 2 | 3 | 3 | x | x | x | Dedicated | 1 (2) | 0 | 0 | 0 | 1 |
| 2 | 4 | 3 | x | x | x | Dedicated | 0 (2) | 0 | 0 | 0 | 0 |
| 2 | 4 | 3 | x | x | x | --- | x (x) | x | x | x | x |

Figure 22:
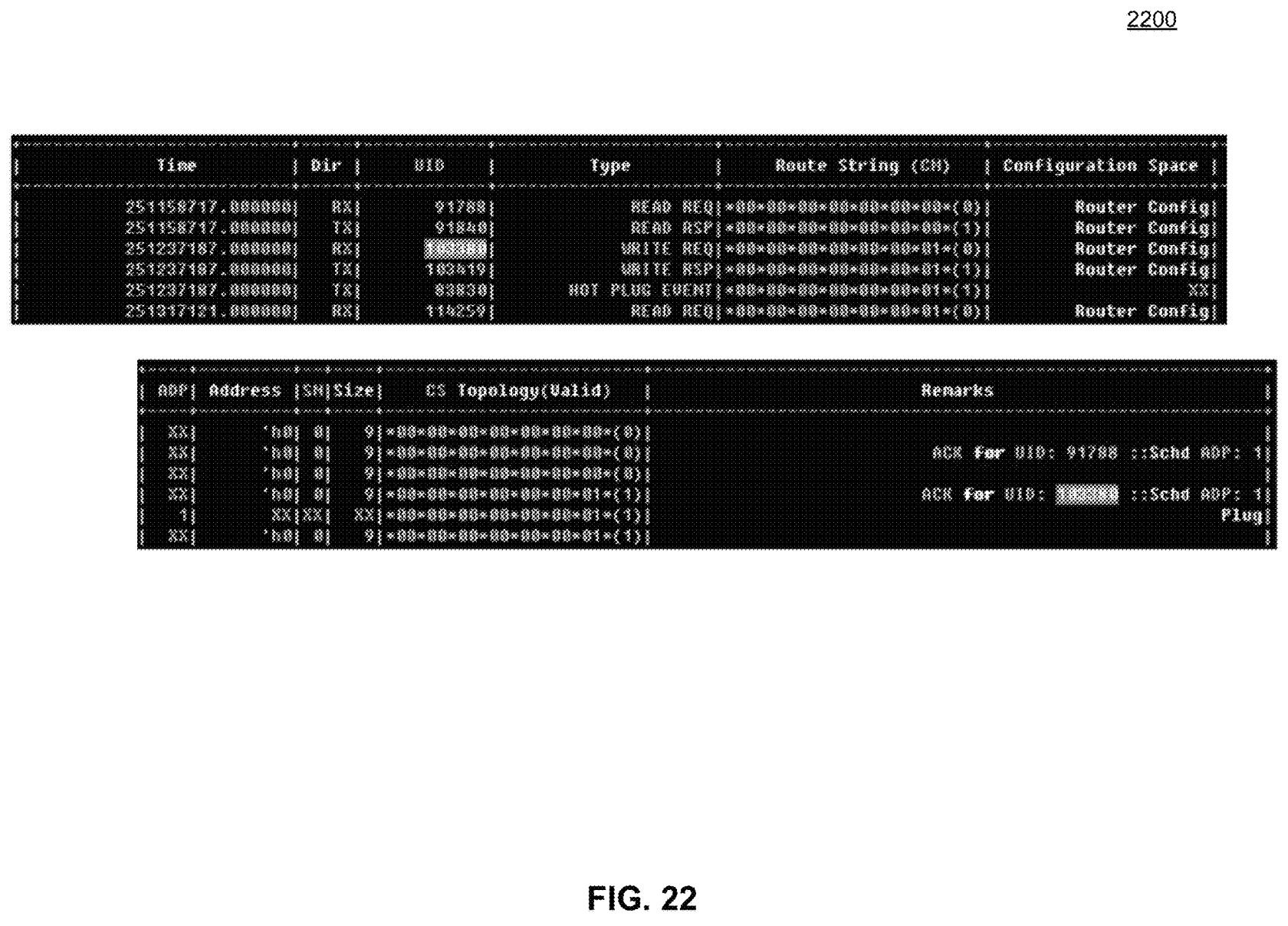

| Time | Dir | UID | Type | Route String (CM) | Configuration Space |
|---|---|---|---|---|---|
| 251158717.000000 | RX | 91788 | READ REQ | *00*00*00*00*00*00*00*(0) | Router Config |
| 251158717.000000 | TX | 91840 | READ RSP | *00*00*00*00*00*00*00*(1) | Router Config |
| 251237187.000000 | RX | [illegible] | WRITE REQ | *00*00*00*00*00*00*01*(0) | Router Config |
| 251237187.000000 | TX | 103419 | WRITE RSP | *00*00*00*00*00*00*01*(1) | Router Config |
| 251237187.000000 | TX | 83830 | HOT PLUG EVENT | *00*00*00*00*00*00*01*(1) | XX |
| 251317121.000000 | RX | 114259 | READ REQ | *00*00*00*00*00*00*01*(0) | Router Config |

| ADP | Address | SN | Size | CS Topology(Valid) | Remarks |
|---|---|---|---|---|---|
| XX | 'h0 | 0 | 9 | *00*00*00*00*00*00*00*(0) | |
| XX | 'h0 | 0 | 9 | *00*00*00*00*00*00*00*(0) | ACK for UID: 91788 ::Schd ADP: 1 |
| XX | 'h0 | 0 | 9 | *00*00*00*00*00*00*00*(0) | |
| XX | 'h0 | 0 | 9 | *00*00*00*00*00*00*01*(1) | ACK for UID: [illegible] ::Schd ADP: 1 |
| 1 | XX | XX | XX | *00*00*00*00*00*00*01*(1) | Plug |
| XX | 'h0 | 0 | 9 | *00*00*00*00*00*00*01*(1) | |

Figure 23:
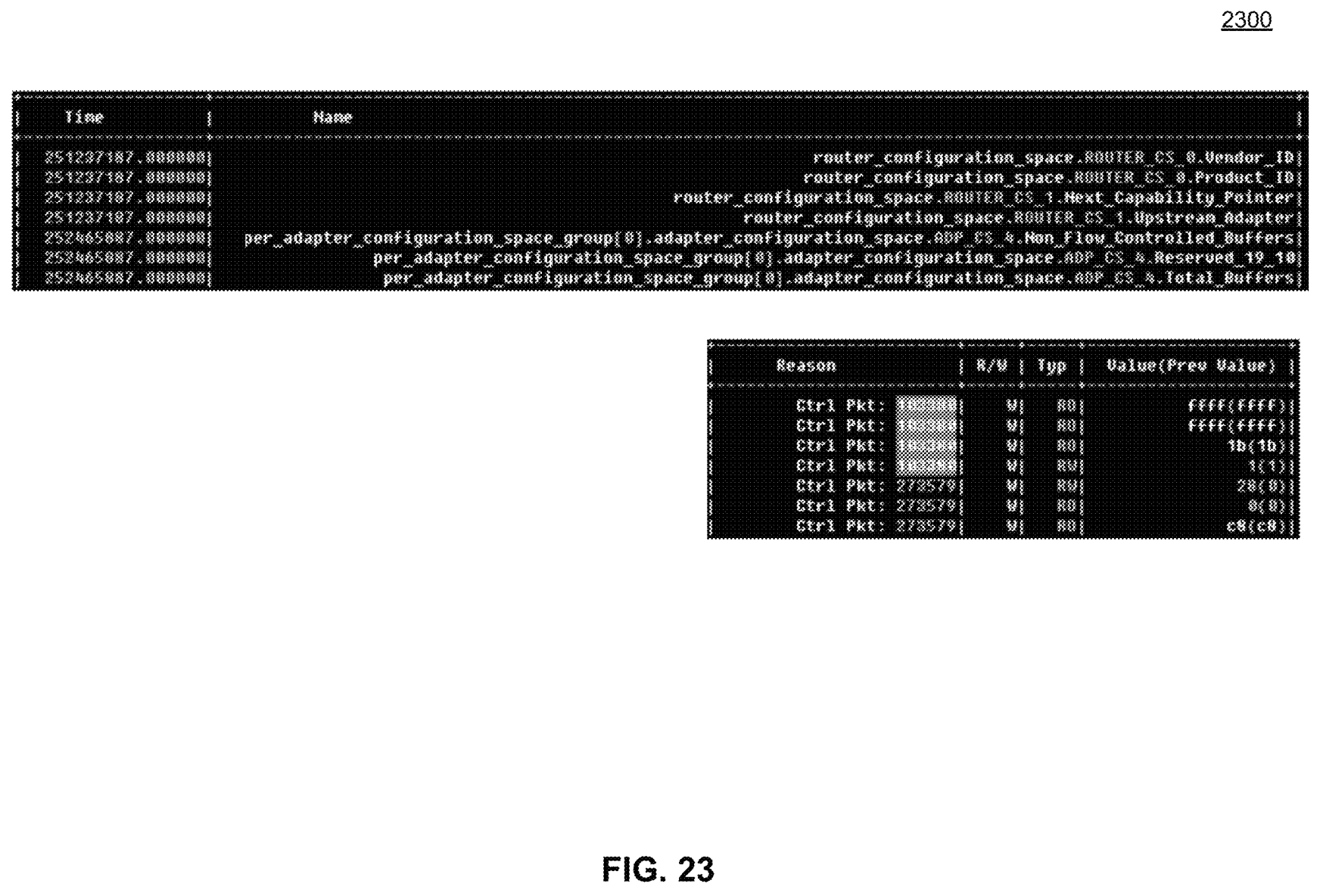

| Time | Name |
|---|---|
| 251237187.000000 | router_configuration_space.ROUTER_CS_0.Vendor_ID |
| 251237187.000000 | router_configuration_space.ROUTER_CS_0.Product_ID |
| 251237187.000000 | router_configuration_space.ROUTER_CS_1.Next_Capability_Pointer |
| 251237187.000000 | router_configuration_space.ROUTER_CS_1.Upstream_Adapter |
| 252465087.000000 | per_adapter_configuration_space_group[0].adapter_configuration_space.ADP_CS_4.Non_Flow_Controlled_Buffers |
| 252465087.000000 | per_adapter_configuration_space_group[0].adapter_configuration_space.ADP_CS_4.Reserved_19_10 |
| 252465087.000000 | per_adapter_configuration_space_group[0].adapter_configuration_space.ADP_CS_4.Total_Buffers |

| Reason | R/W | Typ | Value(Prev Value) |
|---|---|---|---|
| Ctrl Pkt: [illegible] | W | RO | ffff(ffff) |
| Ctrl Pkt: [illegible] | W | RO | ffff(ffff) |
| Ctrl Pkt: [illegible] | W | RO | 1b(1b) |
| Ctrl Pkt: [illegible] | W | RW | 1(1) |
| Ctrl Pkt: 273579 | W | RW | 28(0) |
| Ctrl Pkt: 273579 | W | RO | 0(0) |
| Ctrl Pkt: 273579 | W | RO | c8(c8) |

Figure 24:
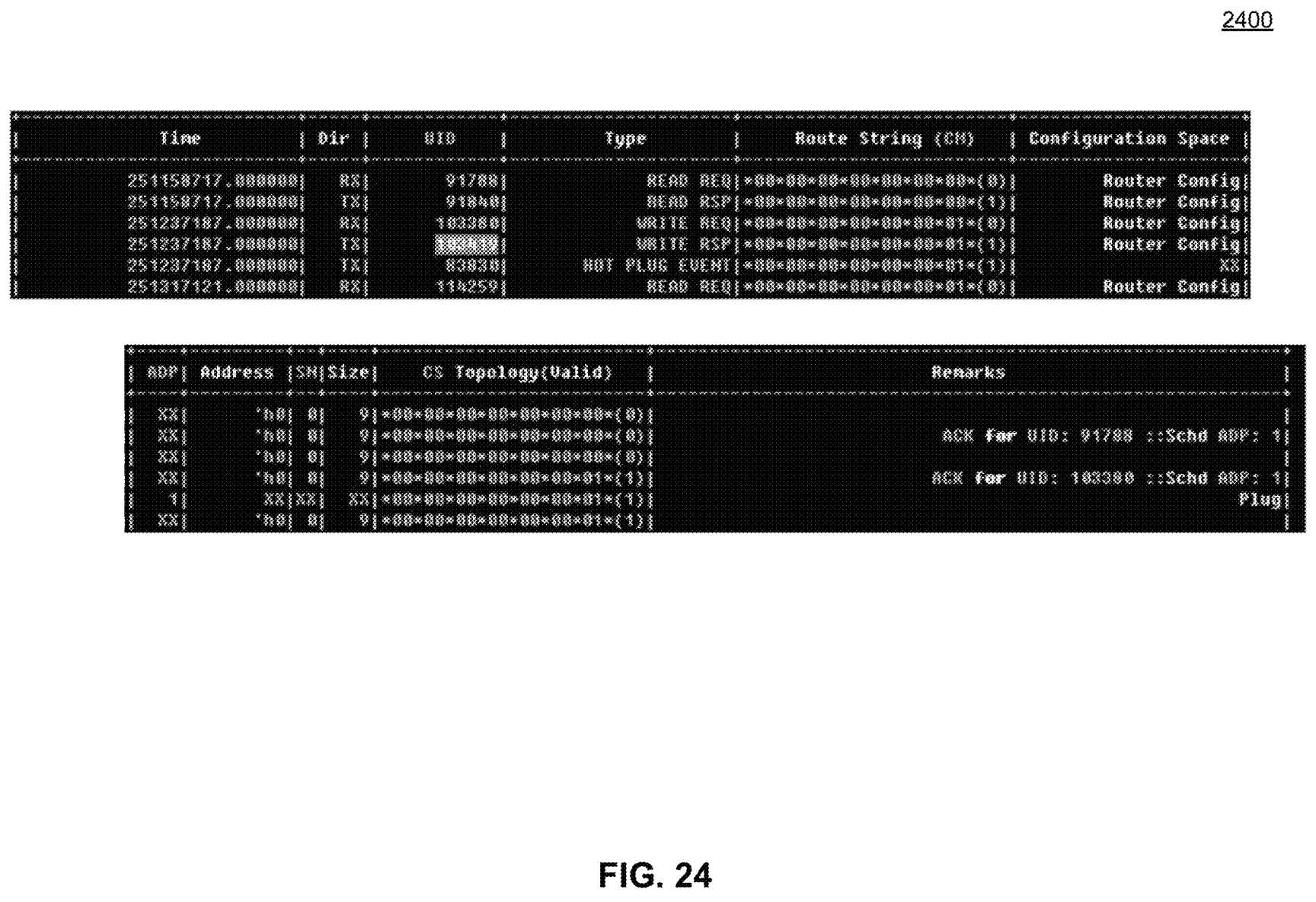

| Time | Dir | UID | Type | Route String (CM) | Configuration Space |
|---|---|---|---|---|---|
| 251158717.000000 | RX | 91788 | READ REQ | *00*00*00*00*00*00*00*(0) | Router Config |
| 251158717.000000 | TX | 91840 | READ RSP | *00*00*00*00*00*00*00*(1) | Router Config |
| 251237187.000000 | RX | 103380 | WRITE REQ | *00*00*00*00*00*00*01*(0) | Router Config |
| 251237187.000000 | TX | [illegible] | WRITE RSP | *00*00*00*00*00*00*01*(1) | Router Config |
| 251237187.000000 | TX | 83830 | HOT PLUG EVENT | *00*00*00*00*00*00*01*(1) | XX |
| 251317121.000000 | RX | 114259 | READ REQ | *00*00*00*00*00*00*01*(0) | Router Config |

| ADP | Address | SN | Size | CS Topology(Valid) | Remarks |
|---|---|---|---|---|---|
| XX | 'h0 | 0 | 9 | *00*00*00*00*00*00*00*(0) | |
| XX | 'h0 | 0 | 9 | *00*00*00*00*00*00*00*(0) | ACK for UID: 91788 ::Schd ADP: 1 |
| XX | 'h0 | 0 | 9 | *00*00*00*00*00*00*00*(0) | |
| XX | 'h0 | 0 | 9 | *00*00*00*00*00*00*01*(1) | ACK for UID: 103380 ::Schd ADP: 1 |
| 1 | XX | XX | XX | *00*00*00*00*00*00*01*(1) | Plug |
| XX | 'h0 | 0 | 9 | *00*00*00*00*00*00*01*(1) | |

| Time | Pkt Type | Activity | UID | Path |
|---|---|---|---|---|
| 0.000000 | --- | Start Egress Scheduler | x | P-x |
| 251078787.000000 | --- | Egress Path Setup | x | P-0 |
| 251237187.000000 | LMP::CR_GRANT::DCT | Egress send LMP/TMU | 103415 | P-x |
| 251237187.000000 | CTRL::WRITE_RSP | Wait Schedule Egress | [illegible] | P-0 |
| 251237187.000000 | CTRL::WRITE_RSP | Push Pkt Egress Q | [illegible] | P-0 |
| 251237187.000000 | CTRL::HOT_PLUG | Wait Schedule Egress | 83830 | P-0 |
| 251237187.000000 | CTRL::HOT_PLUG | Push Pkt Egress Q | 83830 | P-0 |
| 251238650.000000 | --- | Start Egress Scheduler | x | P-x |
| 251238650.000000 | CTRL::WRITE_RSP | Egress Path Pkt | [illegible] | P-0 |
| 251241850.000000 | --- | Start Egress Scheduler | x | P-x |
| 251241850.000000 | --- | Priority Sch Unblk | x | P-x |

| PCL | PCC | SCL | SCC | QoS | Priority | Weight | Egress Buffer | Curr W | Q State | EgressQ |
|---|---|---|---|---|---|---|---|---|---|---|
| x | x | x | x | --- | x | x | x (x) | x | XX | XX |
| 0 | 0 | x | x | Dedicated | 0 | 1 | x (x) | x | XX | STALL |
| x | x | x | x | --- | x | x | x (x) | x | XX | XX |
| x | x | x | x | --- | x | x | 0 (5) | x | OPEN | XX |
| x | x | x | x | --- | x | x | 1 (5) | x | OPEN | XX |
| x | x | x | x | --- | x | x | 1 (5) | x | OPEN | XX |
| x | x | x | x | --- | x | x | 2 (5) | x | OPEN | XX |
| x | x | x | x | --- | x | x | x (x) | x | XX | XX |
| 3 | 2 | x | x | Dedicated | 0 | 1 | 1 (5) | 1 | OPEN | SEND |
| x | x | x | x | --- | x | x | x (x) | x | XX | XX |
| x | x | x | x | --- | x | x | x (x) | x | XX | XX |

| Dir | Start Time | End Time | UID | Packet Type |
|---|---|---|---|---|
| TX | 251078787.000ps | 251078787.000ps | 83870 | LMP::CREDIT_GRANT |
| TX | 251160250.000ps | 251160250.000ps | 91836 | LMP::CREDIT_GRANT |
| TX | 251163450.000ps | 251163450.000ps | 91840 | CONTROL::READ_RESPONSE |
| TX | 251241850.000ps | 251241850.000ps | [illegible] | CONTROL::WRITE_RESPONSE |
| TX | 251248250.000ps | 251248250.000ps | 83830 | CONTROL::HOT_PLUG_EVENT |
| TX | 251318650.000ps | 251318650.000ps | 114307 | LMP::CREDIT_GRANT |

| Status | HopId | Pdf | SuppId | HEC | Len | LMP Sub Heading | | | |
|---|---|---|---|---|---|---|---|---|---|
| | | | | | | ECC | Credit | HopID | L |
| ACCEPT | 1 | 1 | 0 | fe | 4 | e | 2 | 0 | 0 |
| ACCEPT | 1 | 1 | 0 | fe | 4 | 9 | 3 | 0 | 0 |
| ACCEPT | 0 | 1 | 0 | 7b | 52 | x | x | x | x |
| ACCEPT | 0 | 2 | 0 | 66 | 16 | x | x | x | x |
| ACCEPT | 0 | 5 | 0 | 01 | 16 | x | x | x | x |
| ACCEPT | 1 | 1 | 0 | fe | 4 | 1b | 5 | 0 | 0 |

DEBUG METHODOLOGY FOR A USB SUB-SYSTEM USING UNIQUE IDENTIFIER (UID) APPROACH

RELATED APPLICATIONS

The present application claims priority under 35 U.S.C. § 119(e) to U.S. Provisional Patent Application No. 63/072,397, titled "Debug methodology for a USB sub-system using unique identifier (UID) approach" and filed on Aug. 31, 2020, which is hereby incorporated by reference in its entirety for all purposes.

FIELD

The present application generally relates to an electronic design automation (EDA) system. In particular, the present application is related to a system and method for debug methodology for a universal serial bus (USB) subsystem using a unique identifier (UID) approach.

BACKGROUND

With the introduction of the USB4 specification, the USB ecosystem becomes increasingly bigger and more complex. The protocol level abstraction of USB has now risen from being a communication protocol, with its own data format exchanged over a USB specific connector, to a communication protocol that combines communication protocols like USB3, display port (DP), peripheral component interconnect express (PCIe) through a common type-C connector. USB4 protocol also defines a communication protocol for direct host-to-host data communication.

USB4 protocol defines a packet structure and physical layer over the type-C connector. For the purpose of compatibility and to bring all the connected protocols under USB4 protocol, new protocol adapters are defined, which convert the specific protocol data to the USB4 protocol packet.

USB4 protocol adds a new protocol transport layer to arbitrate through the connected protocols and send packets over a link. The transport layer adds its buffers, priority, and weights to arbitrate over a plurality of sources to a single sink or distribute a single source to a plurality of sinks.

Hence, this complex subsystem brings forth its own set of verification challenges since a single error in any of the layers may show up as an unrelated error at the connected device. USB4 subsystem verification requires many teams, each working on a different USB4 protocol layer, and verification for a specific protocol layer needs enough granular details to identify a root cause for a layer-specific problem. Accordingly, localizing and identifying a root cause of a problem in a USB4 subsystem poses a substantial challenge.

USB4 subsystem performance verification is also a very important component for validation and debugging of USB designs. A delayed packet at the connected device may result in protocol level failures. Localizing and identifying a root cause of the origin of the delay in a long USB4 path is a challenge. In addition, multiple transactions can result in configuration changes in the USB4 subsystem, which may result in some protocol error. Identifying a root cause for a transaction error from erroneous memory access is a challenge.

SUMMARY

In one embodiment, a method is disclosed. The method includes The method includes converting a first message in a first protocol format received at a first functional logical block of a plurality of functional logical blocks of an electronic subsystem into a second message in a second protocol format at the first functional logical block. The second message includes a unique identifier (UID), and generating a first trace file at the first functional logical block. The first trace file includes the UID. The method includes forwarding the second message from the first functional logical block to the second functional logical block, and generating a second trace file at the second functional logical block, wherein the second trace file includes the UID. The method includes debugging the first functional logical block and the second functional logical block based on the first trace file and the second trace file using the UID.

In another embodiment, a system is disclosed. The system includes a memory a memory configured to store operations, and one or more processors configured to perform the operations. The operations include converting a first message in a first protocol format received at a first functional logical block of a plurality of functional logical blocks of an electronic subsystem of the system into a second message in a second protocol format at the first functional logical block. The second message includes a unique identifier (UID. The operations include generating a first trace file at the first functional logical block. The first trace file includes the UID. The operations include forwarding the second message from the first functional logical block to the second functional logical block, and generating a second trace file at the second functional logical block. The second trace file includes the UID. The operations includes debugging the first functional logical block and the second functional logical block based on the first trace file and the second trace file using the UID.

In yet another embodiment, a non-transitory, tangible computer-readable device having instructions stored thereon is disclosed. The instructions when executed by at least one computing device, causes the at least one computing device to perform operations including converting a first message in a first protocol format received at a first functional logical block of a plurality of functional logical blocks of an electronic subsystem of the at least one computing device into a second message in a second protocol format at the first functional logical block. The second message includes a unique identifier (UID. The operations include generating a first trace file at the first functional logical block. The first trace file includes the UID. The operations include forwarding the second message from the first functional logical block to the second functional logical block, and generating a second trace file at the second functional logical block. The second trace file includes the UID. The operations includes debugging the first functional logical block and the second functional logical block based on the first trace file and the second trace file using the UID.

BRIEF DESCRIPTION OF THE DRAWINGS

The following Detailed Description, Figures, appended Additional Figures and appended Claims signify the nature and advantages of the innovations, embodiments and/or examples of the present disclosure. All of the Figures signify innovations, embodiments, and/or examples of the present disclosure for purposes of illustration only and do not limit the scope of the present disclosure. Such figures are not necessarily drawn to scale and are part of the disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 6 illustrates a portion of a trace file corresponding to a protocol adapter, according to an embodiment of the present disclosure.

FIG. 8 illustrates a portion of a trace file corresponding to a router egress path, according to an embodiment of the present disclosure.

FIG. 10 illustrates a portion of a trace file corresponding to a memory, according to an embodiment of the present disclosure.

FIG. 11 illustrates a portion of a trace file corresponding to a lane adapter transmit (Tx), according to an embodiment of the present disclosure.

FIG. 12 illustrates a portion of a trace file corresponding to a lane adapter receive (Rx), according to an embodiment of the present disclosure.

FIG. 15 illustrates a protocol adapter trace for a USB3 packet to USB4 packet conversion, according to an embodiment of the present disclosure.

FIG. 16 illustrates ingress trace information, according to an embodiment of the present disclosure.

FIG. 17 illustrates egress trace information, according to an embodiment of the present disclosure.

FIG. 18 illustrates a lane adapter Tx trace, according to an embodiment of the present disclosure.

FIG. 20 illustrates lane adapter trace display, according to an embodiment of the present disclosure.

FIG. 21 illustrates lane adapter ingress trace, according to an embodiment of the present disclosure.

FIG. 22 illustrates a control adapter trace, according to an embodiment of the present disclosure.

FIG. 23 illustrates memory trace records, according to an embodiment of the present disclosure.

FIG. 24 illustrates an egress queue of the lane adapter, according to an embodiment of the present disclosure.

FIG. 25 illustrates an egress trace, according to an embodiment of the present disclosure.

Figure 1:
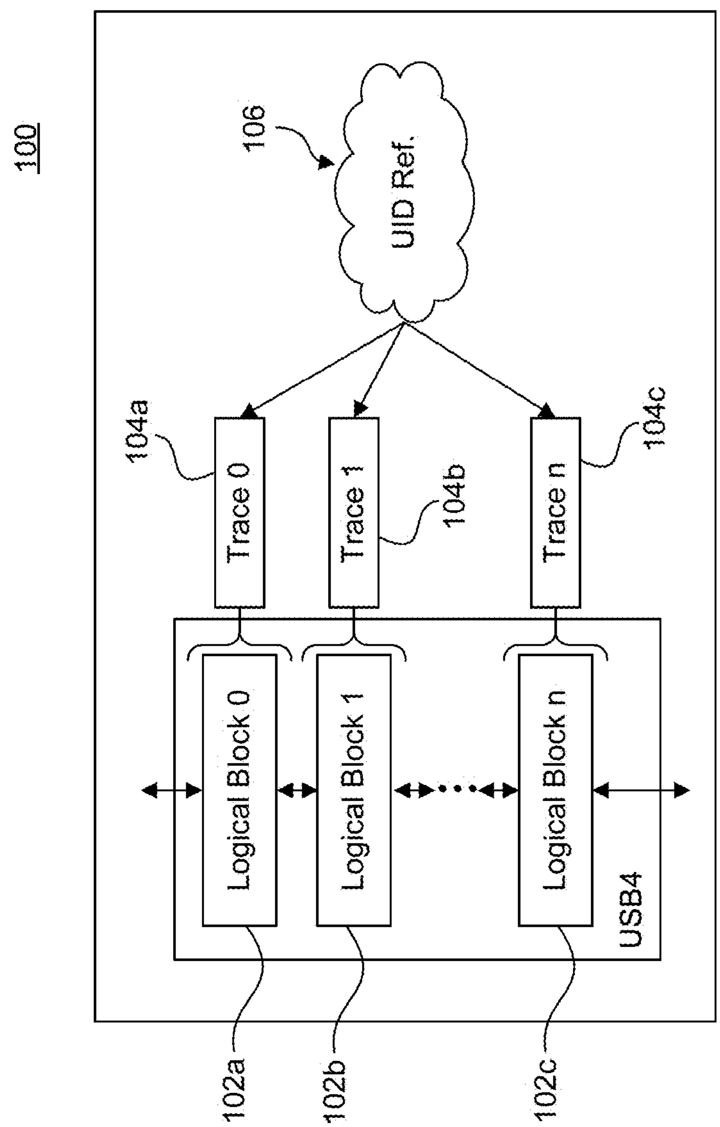
FIG. 1 illustrates logical abstraction of USB4 protocol trace files, according to an embodiment of the present disclosure.

In such various figures, reference signs may be omitted as is consistent with accepted engineering practice; however, one of ordinary skill in the art will understand that the illustrated components are readily understood when viewed in the context of the illustration as a whole and the accompanying disclosure describing such various figures.

DETAILED DESCRIPTION OF THE DISCLOSURE

Under 'shift-left' software testing ideology, software testing and system testing is performed earlier in the software or system development lifecycle. In the case of systems that incorporate USB4 components, the complexity of the USB4 subsystem adds to the debug challenge. It is an objective of this disclosure to provide a powerful debug methodology to shift-left the verification lifecycle for USB4 subsystem verification using transaction traces that use a unique identifier (UID) for a USB4 packet processing across various functional blocks of the USB4 subsystem. With the approaches detailed herein, aspects allow for analyzing a transaction across various logical function blocks.

In some embodiments, a set of transaction trace files may track the lifetime of a USB4 packet in a USB4 subsystem, irrespective of the source of the packet, for example, USB3, USB4, PCIe, and DP.

In a USB4 verification subsystem, each logical function block of a plurality of functional logical blocks may have a unique functionality. The USB4 packets, received from an external peripheral and/or generated as a conversion from other type of packets such as USB3, PCIe, and/or DP, etc., may be transmitted through the subsystem. The individual trace files for each functional logical block may be generated by the verification subsystem, which records unique aspects of the USB4 packet transactions that may be performed with respect to that block. In some embodiments, a transaction corresponds to a processing operation that may be performed on a USB4 packet at functional logical block of a USB4 subsystem. A unique identifier (UID) associated with each transaction may help in analyzing the same transaction across the traces corresponding to various functional logical blocks. In some embodiments, a tracefile corresponding to each functional block of a USB4 subsystem is generated. In some embodiments, a trace file may include a record of a packet's protocol stack information and timing information. The USB4 packet using this UID may be tracked across all the trace file corresponding to various functional logical blocks of a USB4 subsystem. In some embodiments, the USB4 packet may be traced across multiple trace files by identifying the UID corresponding to the USB4 packet.

Advantages of the present disclosure include, but are not limited providing an powerful debug methodology to shift-left the verification lifecycle for USB4 subsystem verification. Another specific advantage includes providing an ability to fully debug a logical block using a detailed trace corresponding to the logical block. Another advantage of the present disclosure includes providing an ability to track a USB4 packet across multiple logical blocks, using a UID, to identify where a packet may have defaulted or encountered an error in the subsystem.

FIG. 1 illustrates a logical view of USB4 protocol trace files, according to an embodiment of the present disclosure. As shown in FIG. 1, logical block 0 102*a*, logical block 1 102*b*, and logical block n 102*n* represent functional logical blocks (e.g., a protocol adapter, a router, a control adapter, a register configuration space, and a lane adapter) with USB4 subsystem 100. The USB4 subsystem 100 generates trace files 104*a*, 104*b*, and 104*n* for multiple functional logical blocks, i.e., a trace file per functional logical block. In some embodiments, a trace file contains event logs during a simulation process. In some embodiments, a trace file may include a record of a packet's protocol stack information and timing information. A unique identifier (UID) reference 106 may be used to analyze a transaction in the plurality of trace files 104*a* through 104*n*.

The transaction traces may help users to fully debug a specific functional logical block. With the UID reference, delay in a USB4 packet adversely affecting the performance of the USB subsystem may be identified using the transaction traces. In addition, a particular functional logical block where the USB4 packet resulted in default and/or an error can also be identified. Erroneous access to USB4 memory can be quickly localized to the faulty USB4 packet and its memory corruption.

In some embodiments, the USB4 subsystem may include functional logical blocks, such as a protocol adapter, a router, a control adapter, a register configuration space, and/or a lane adapter, etc. By way of a non-limiting example, the protocol adapter may receive packets from or transmit packets to the connected protocol stacks or USB3/PCIe/DP or a host. The router may route data between a connected protocol adapter and the lane adapter. By way of a non-limiting example, the router may have separate paths for ingress and egress packets. For example, an ingress path may receive packets incoming to the router and store it in an ingress buffer, and an egress path may schedule packets outgoing from the router from an egress buffer. The control adapter may receive and transmit control packets. By way of a non-limiting example, the control adapter may also manage the register configuration space, in which multiple configuration registers are stored. The lane adapter may encode USB4 packets for transmitting and/or decode USB4 packets upon receiving on a plurality of packet lines.

In the following section, data flow inside a USB4 subsystem, according to some embodiments, is outlined.

In some embodiments, a USB4 subsystem may include multiple elements, such as a source and a sink of protocol data from a plurality of protocol stacks, or a protocol stack-specific adapter, etc. By way of a non-limiting example, the protocol stack may be of USB3.x, PCIe, or DP. In some embodiments, the protocol data my include data resulting directly from a Host. The protocol stack-specific adapter may convert protocol data to USB4 data format and vice versa. The lane adapter may be connected to a physical interface, for example, of Type-C. The router may arbitrate packets from protocol adapters to a lane adapter and distribute packets received on the lane adapter to the plurality of protocol adapters. The USB4 subsystem may include a TMU (Time Management Unit). The TMU may schedule and receive TMU packets from the lane adapter and the router. The USB4 susbsystem may include a LMP (Link Management Packets) generator. The LMP generator may schedule router-generated LMP packets used for link management.

In some embodiments, the USB4 subsystem may include various types of data flow, such as USB4 egress from protocol adapter, USB4 ingress to protocol adapter, and USB4 control adapter exchange. Each data flow is described in detail below.

Figure 2:
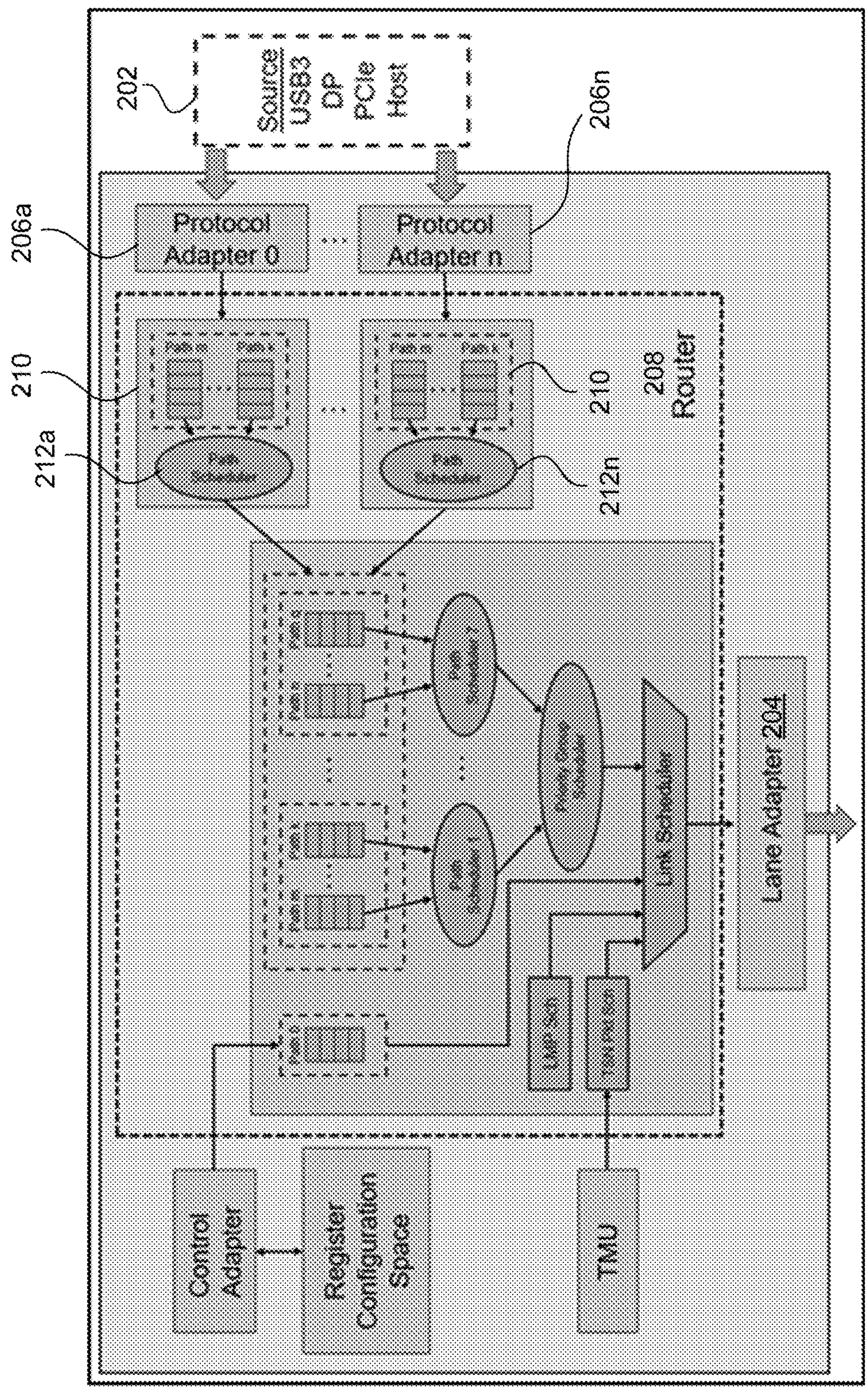
FIG. 2 illustrates a USB4 packet path for a source protocol adapter, according to an embodiment of the present disclosure.

FIG. 2 illustrates a data flow corresponding to USB4 egress from a protocol adapter, according to an embodiment of the present disclosure. The USB4 egress data flow from the protocol adapter may include a USB4 packet path, as shown in FIG. 2, from a protocol stack 202 to physical lines (not shown) of a lane adapter 204. The USB4 egress data flow path may have a protocol packet originated from a protocol stack 202, i.e., a source of the protocol packet, converted to USB4 packet format in the protocol adapter 206*a* through 206*n*, and sent to a router 208. The source of the protocol packet may be a USB3, a DP, a PCIe, and/or a direct host, etc. The router 208 may receive the USB4 packet and store it in the buffer of the specified path as programmed in configuration space 210 of the specific ingress adapter. The packet from the ingress path may be stored in the buffer of the specified egress path as programmed in a configuration space of the lane adapter 204 when there is space available. The lane adapter scheduler 212*a* through 212*n*, based on the packets as presented to be scheduled, may select a packet to be sent on the lane adapter. The lane adapter 204 may then send the packet on the physical lines (not shown).

Figure 3:
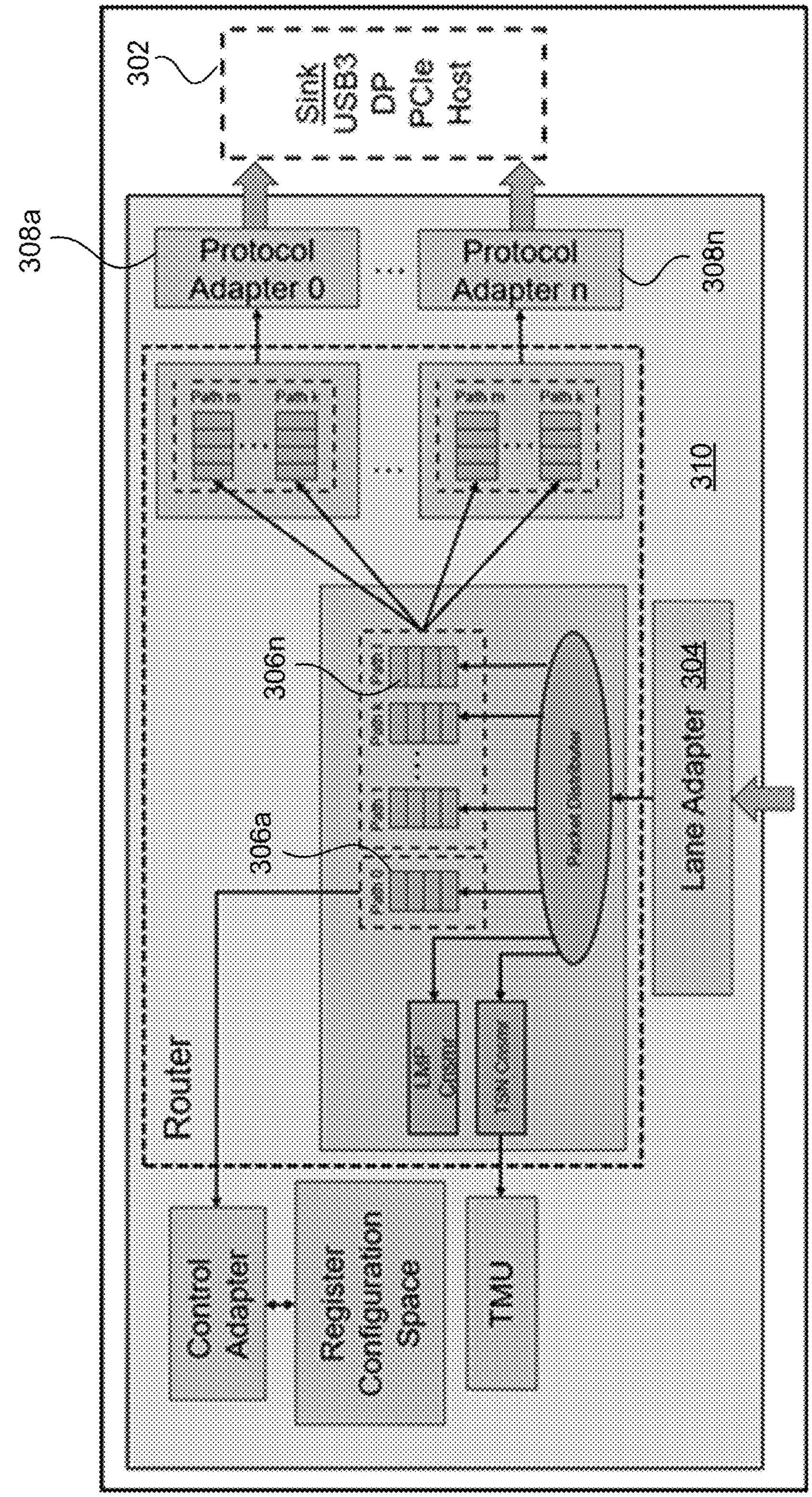
FIG. 3 illustrates a USB4 packet path for a sink protocol adapter, according to an embodiment of the present disclosure.

FIG. 3 illustrates a data flow for USB4 ingress to a protocol adapter, according to an embodiment of the present disclosure. The USB4 packet path ingress to the protocol adapter may include a path for a packet originating from physical lines, decoded at lane adapter, to the protocol stack. The USB4 packet may be decoded from the physical lines (not shown) at lane adapter 304. The USB4 packet, depending on the decoded fields, may be stored in the respective ingress path buffer 306*a* through 306*n*, as programmed in the configuration space of the lane adapter 304, if a buffer has an available space. The packet from the ingress path may be sent to the egress path as programmed in the configuration space of the target protocol adapter when space is available in the buffer. The protocol adapter 308*a* through 308*n* may receive the packet from the egress buffer in the router 310 when ready. The protocol adapter 308*a* through 308*n* may convert the USB4 packet to the protocol layer packet and send it to the protocol stack 302.

Figure 4:
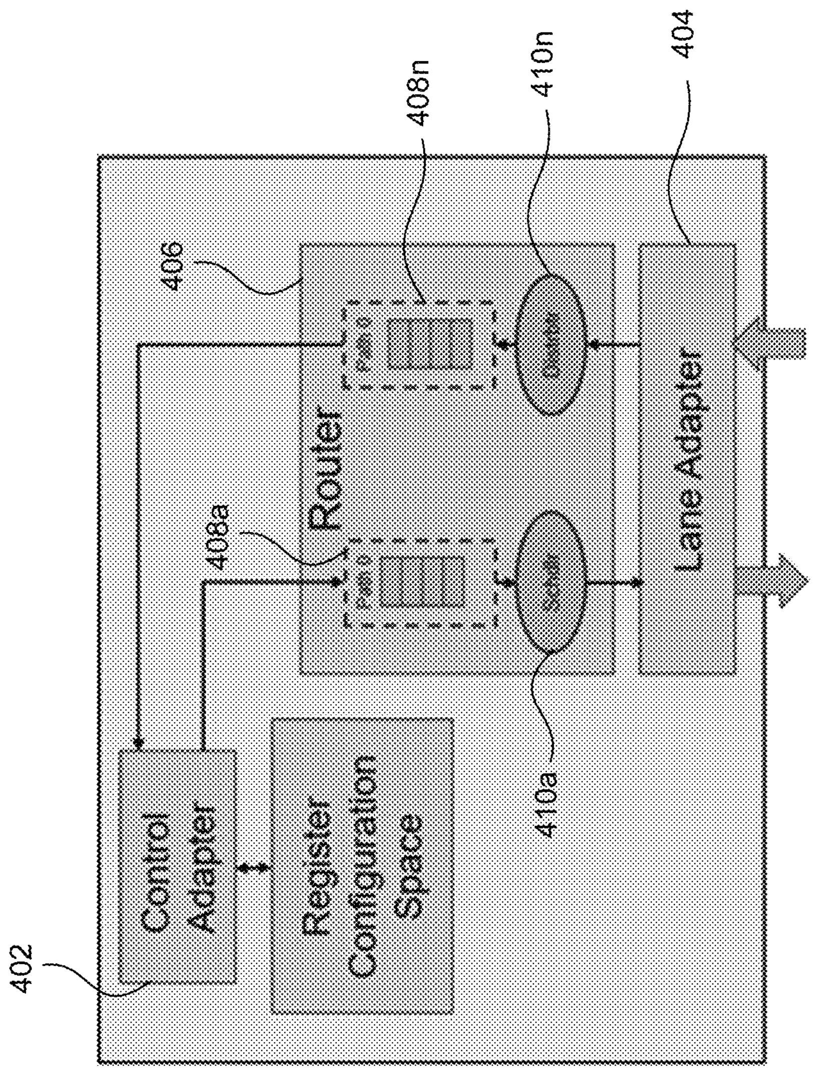
FIG. 4 illustrates a control adapter packet exchange, according to an embodiment of the present disclosure.

FIG. 4 illustrates a control adapter packet exchange, according to an embodiment of the present disclosure. The control adapter packet exchange may occur between a control adapter 402 and a lane adapter 404 via a router 406. The packet exchange may be of (1) egress packet to the lane adapter 404, and (2) ingress packet to lane adapter 404, as described below in detail. By way of a non-limiting example, a packet may originate from the control adapter 402 and stored in the buffer of the egress path egress path 0 408*a* of router 406 if space is available. The scheduler 410*a* may arbitrate overall available packets and send the packet to the lane adapter 404. The lane adapter 404 may encode and transmit the packet over the physical lines. An ingress packet received at the physical lines at the lane adapter may be decoded and sent to the router 406. The packet, based on the decoded fields, may be saved in the ingress buffer of path 0 408*n* if space is available. The packet may be received and processed by the control adapter 402. By way of a non-limiting example, if the packet is for memory access, the control adapter 402 may generate a response packet, which may be sent to the egress path 0 408*a* of the lane adapter 404, as described above.

Figure 5:
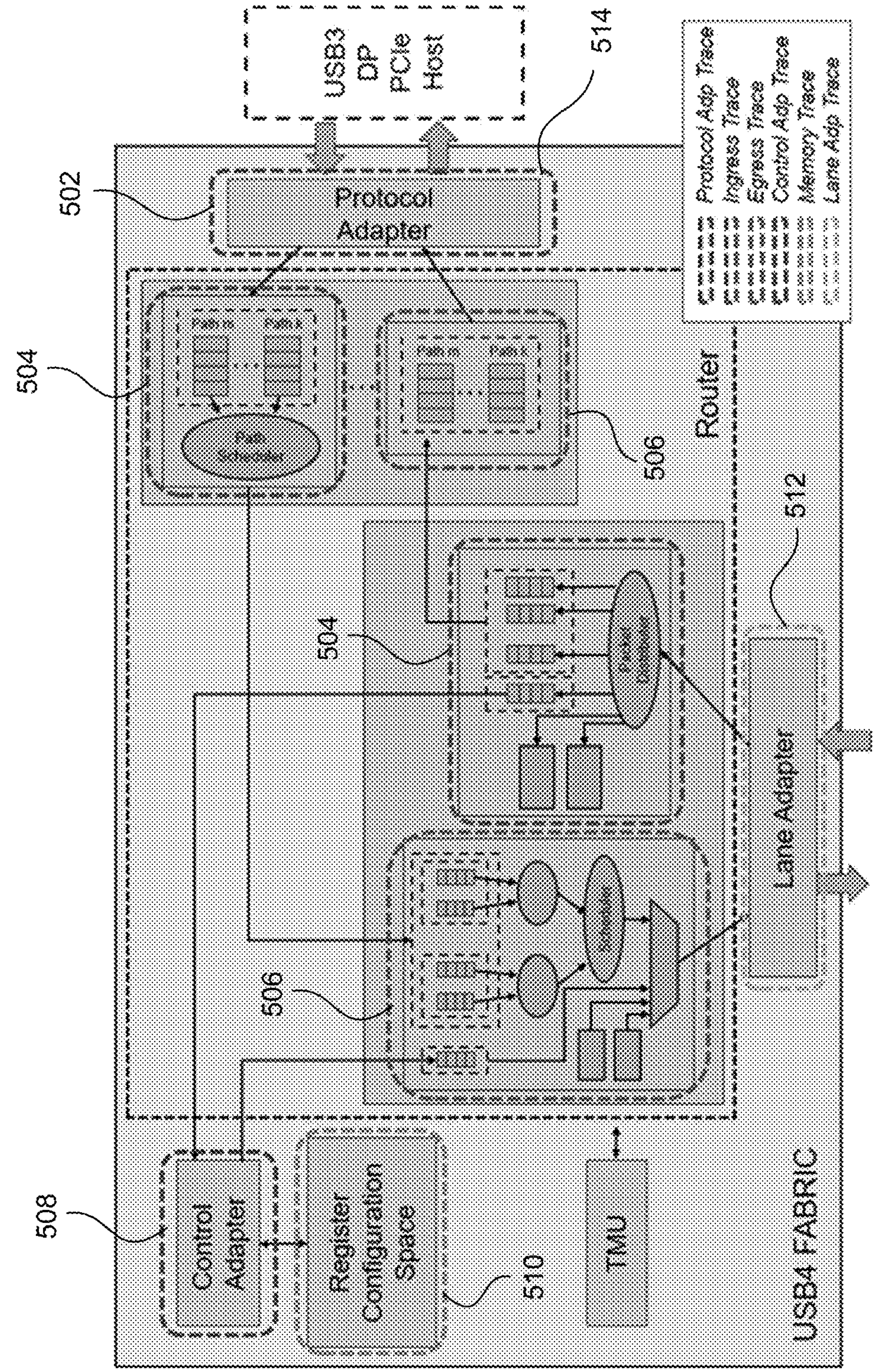
FIG. 5 illustrates multiple traces per logical block in a USB4 subsystem, according to an embodiment of the present disclosure.

The USB4 subsystem may support individual trace files for all the logical blocks mentioned above. A logical abstraction of the USB4 subsystem and the trace file boundaries may be as shown in FIG. 5, according to an embodiment of the present disclosure. The trace files part of the USB4 verification subsystem may include protocol adapter trace 502, router ingress path trace 504, router egress path trace 506, control adapter trace 508, memory trace 510, and lane adapter trace 512, for example.

FIG. 6 illustrates a portion of a trace file corresponding to a protocol adapter, according to an embodiment of the present disclosure. The trace file may be created for each protocol adapter 514 of a plurality of protocol adapters (not shown) connected to each other. The protocol adapter trace 600 may record a packet's protocol stack-specific information. The protocol stack may be USB3, PCIe, DP and/or Host. By way of a non-limiting example, for USB3, if a packet type is ordered set, low frequency periodic signaling (LFPS), etc., then packet direction, timing information to record entry, or an exit of the packet either in or out of the adapter may be recorded. Packet payload, as defined in the source protocol stack and transaction ended status, may also be recorded. By way of a non-limiting example, the protocol adapter trace file name may be named as <hierarchy of agent>.router_core[<id>].tunnel_env[<id>].<protocol adapter>.<protocol>_pkt_trace.

Figure 7:
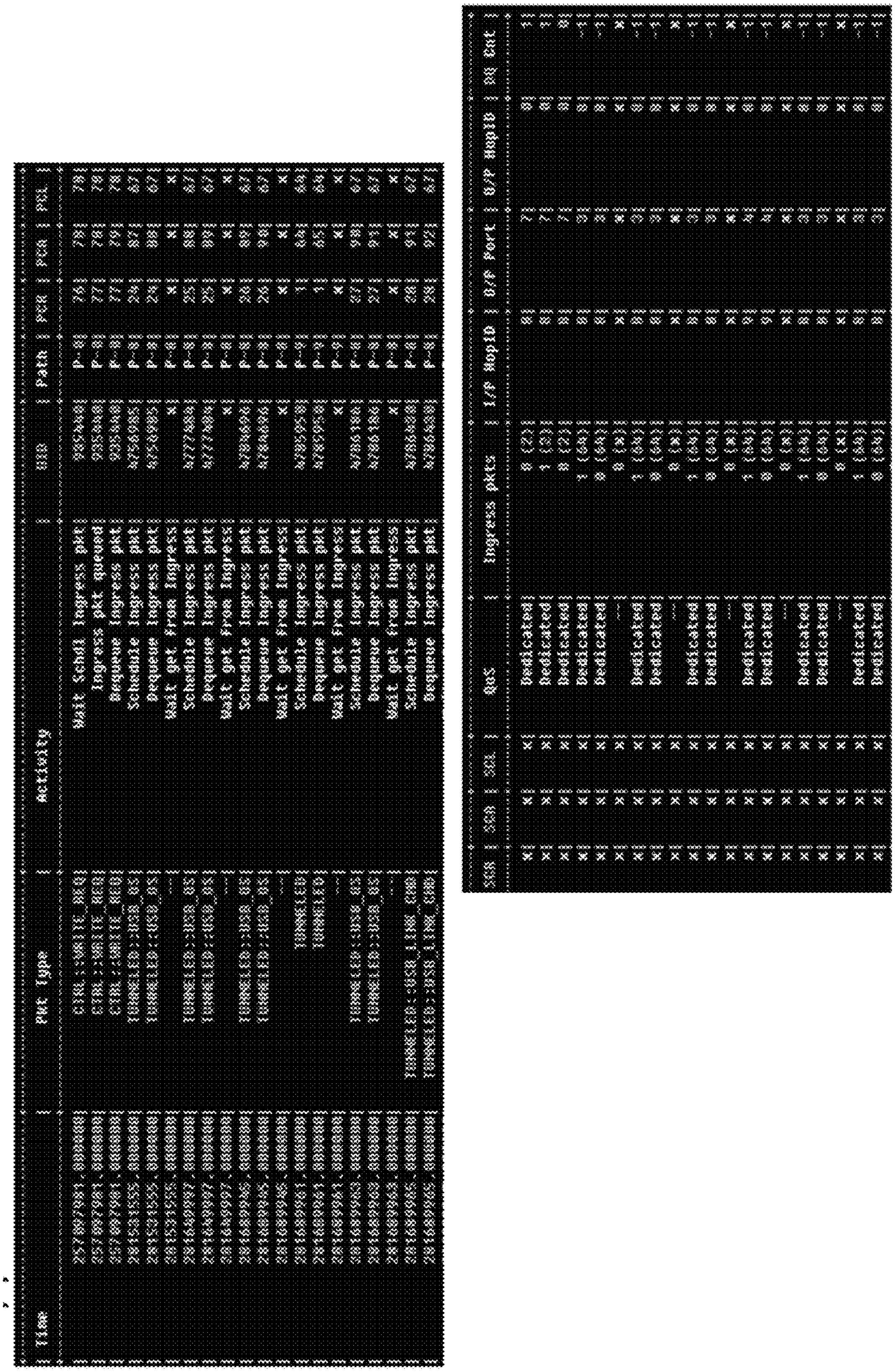
FIG. 7 illustrates a portion of a trace file corresponding to a router ingress path, according to an embodiment of the present disclosure.

FIG. 7 illustrates a portion of a trace file corresponding to a router ingress path, according to an embodiment of the present disclosure. The trace file may be created for each adapter's ingress scheduler and include all paths in the specified adapter. As shown in FIG. 7, the information recorded in the router ingress path trace snippet 700 may be buffer allocation and current consumption per path, USB4 packet types such as Tunnel, LMP, or Control, etc., path enable or disable logs, Timestamps of each activity to track the lifetime of the packet, and other routing information. By way of a non-limiting example, the router ingress path trace file name may be named as: <hierarchy>.router_core[<id>] .usb4_port_scheduler[<id>].ingress_trace.

FIG. 8 illustrates a portion of a trace file corresponding to a router egress path, according to an exemplary embodiment of the present disclosure. The route egress path trace file may be created for each adapter's egress scheduler that includes all paths in the specified adapter. As shown in FIG. 8, information that may be recorded in the route egress path trace file 800 may include buffer allocation and current consumption per path, type of the transmitted USB4 packet, such as Tunnel, LMP, or Control, etc., path enable or disable logs, timestamps of each activity to track the lifetime of the packet, scheduling information, and other routing information, etc. By way of a non-limiting example, the router ingress path trace file name may be named as: <hierarchy>. router_core[<id>].usb4_port_scheduler[<id>].egress_trace.

Figure 9:
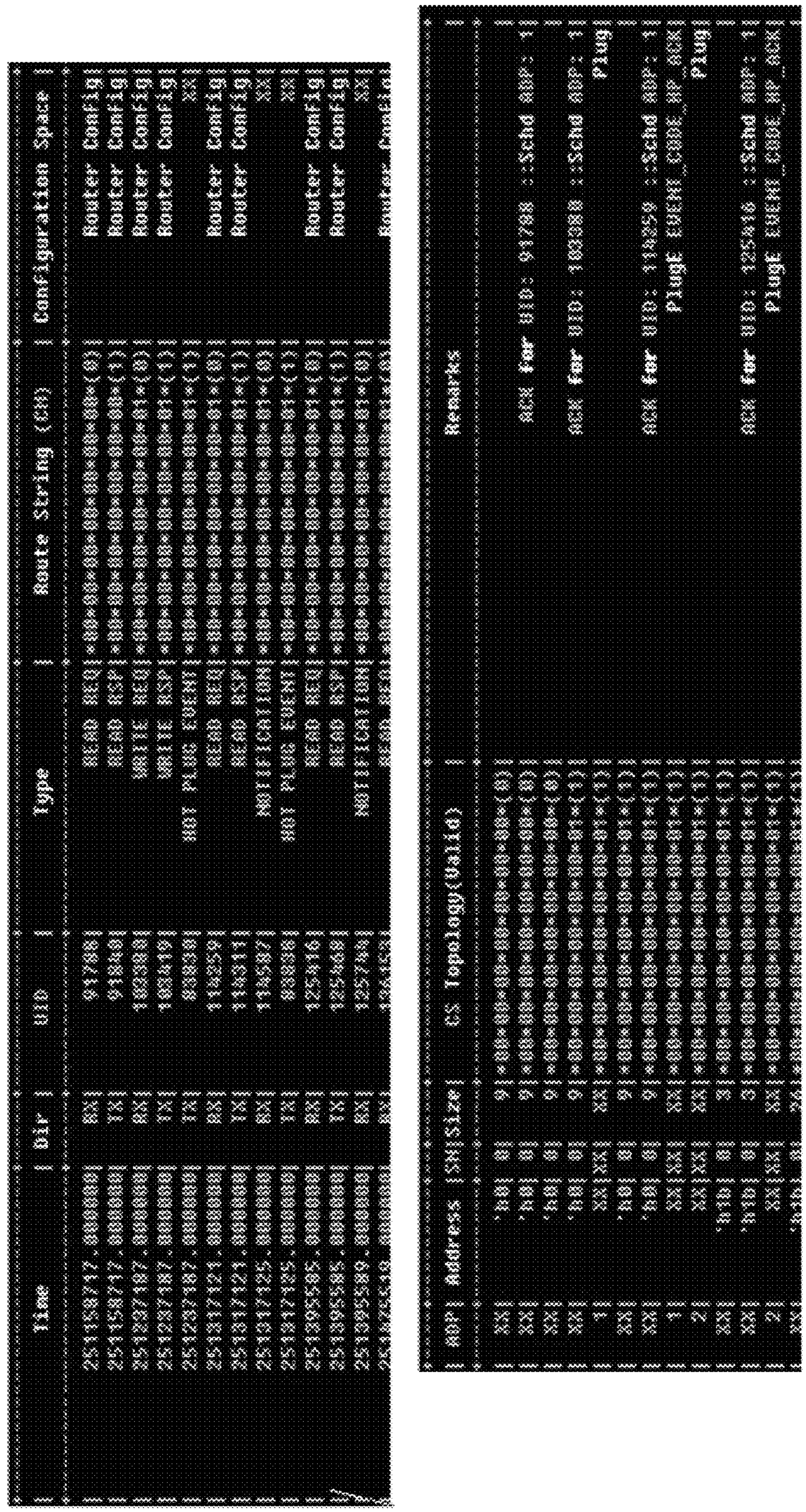
FIG. 9 illustrates a portion of a trace file corresponding to a control adapter, according to an embodiment of the present disclosure.

FIG. 9 illustrates a portion of a trace file corresponding to a control adapter, according to an embodiment of the present disclosure. The control adapter trace file may be created for each control adapter per router. As shown in FIG. 9, information that may be recorded in the control adapter trace file 900 may include all exchanged control packets, control read or write transaction loops with response packet, timing points of all transactions, and control packet specific information, etc. By way of a non-limiting example, the control adapter trace file may be named as: <hierarchy>.router_core [id].router_configuration_layer.pkt_trace.

FIG. 10 illustrates a portion of a trace file corresponding to a memory, according to an embodiment of the present disclosure. The memory trace file may be created for each configuration space per router. As shown in FIG. 10, information that may be recorded in the memory trace file 1000 may include memory operations and value changes with packet association, and timing points of each operation, etc. By way of a non-limiting example, the memory trace file may be named as <hierarchy>.router_core[<id>].configuration_space_trace.

FIG. 11 illustrates a portion of a trace file corresponding to a lane adapter trace transmit (Tx) and FIG. 12 illustrates a portion of a trace file corresponding to a lane adapter trace receive (Rx), according to an embodiment of the present disclosure. Accordingly, one trace file 1100 for the transmit operation of the lane adapter and another trace file 1200 for the receive operation of the lane adapter may be created. For the transmit and receive operation of the lane adapter, recorded information in the trace files may include USB4 specific packet header information, packet start and the end time that align with the packet's time on the physical lines, payload information on each packet, and the transaction ended status, etc. By way of a non-limiting example, the trace file names for the transmit and the receive operation may be named using a format such as <hierarchy>. router_core<id>.usb4_port_agent<id>.transport.USB4.TX.pkt_trace and <hierarchy>.router_core<id>.usb4_port_agent <id>.transport.USB4.RX.pkt_trace, respectively.

In some embodiments, each USB4 packet within the USB4 subsystem may be assigned a unique identification number (UID), which may be a number imported from universal verification methodology (UVM) supported API of 'get_inst_id.' In some embodiments, a UVM standard function 'get-inst-id' may be called to return a numerical instance identifier which may be assigned to each USB4 packet as a unique identification number. The USB4 packet using this UID may be tracked across all the available trace files. In some embodiments, a search may be performed on the contents of a trace file to identify the UID corresponding to the USB4 packet. In some embodiments, the USB4 packet may be traced across multiple trace files by identifying the UID corresponding to the USB4 packet. Accordingly, the lifetime and operations on the USB4 packet in the USB4 subsystem may be analyzed.

Figure 13:
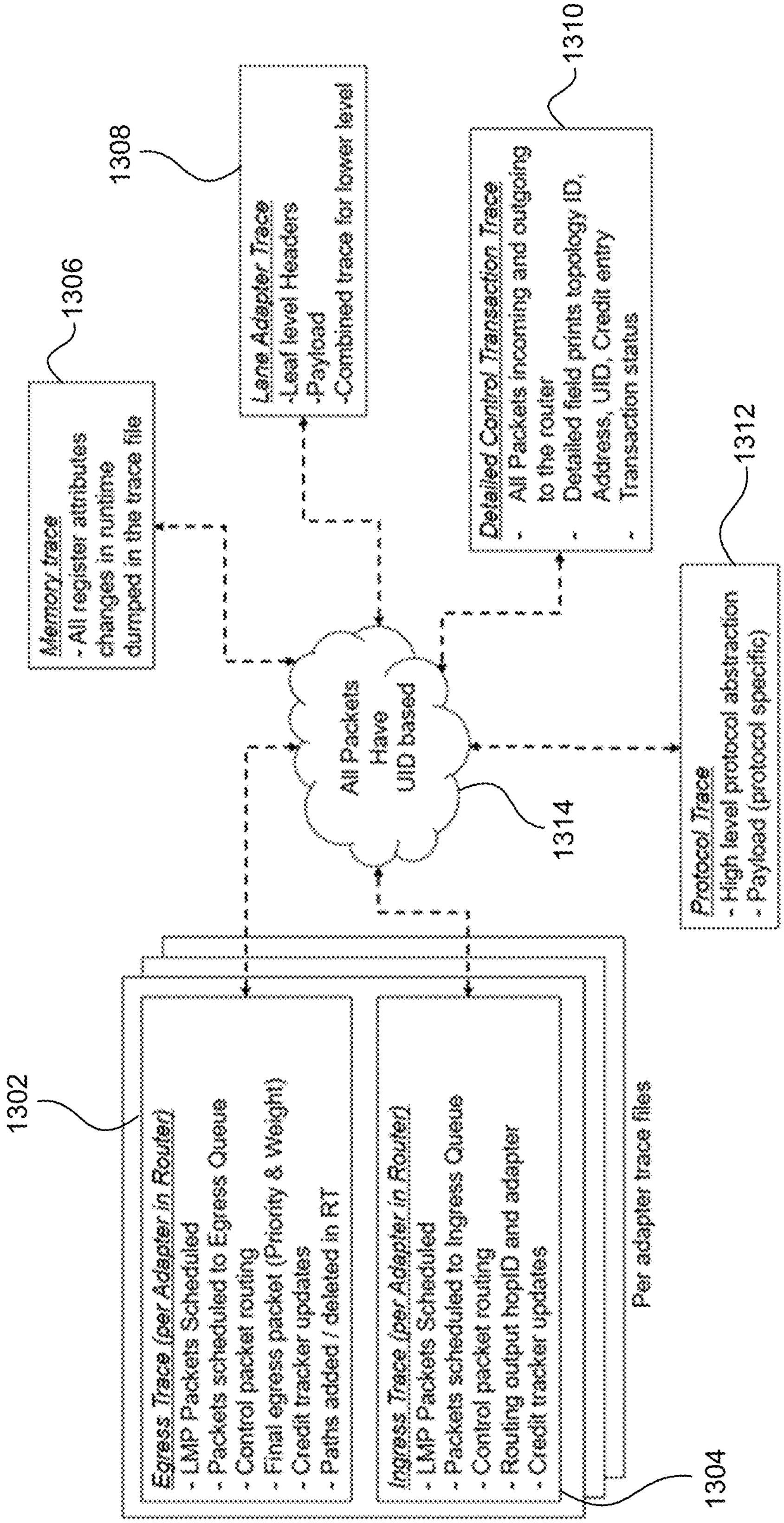
FIG. 13 illustrates a unique identifier (UID) connected logical abstraction of traces, according to an embodiment of the present disclosure.

FIG. 13 illustrates a unique identifier (UID) connected logical abstraction of traces, according to an embodiment of the present disclosure. As shown in FIG. 13, a logical association of the different traces, such as egress trace for per adapter in a router 1302, ingress trace per adapter in the router 1304, memory trace 1306, lane adapter trace 1308, detailed control transaction trace 1310, and protocol trace 1312 may be supported and stitched with UID 1314. Since the same UID is used as the USB4 packet flows through various functional logical blocks, analysis of the lifetime of the USB4 packet becomes an easy process.

USB4 Trace File Verbosity Control

In some embodiments, depending on the severity of the problem, the amount of information detail in a trace file corresponding to packet transformations in the USB4 subsystem may be altered based on the severity of a problem. In some embodiments, trace file writing may be controlled via a verbosity level switches. In some embodiments, a verbosity level switch enables selecting a verbosity level which may limit the extent of information that is included in a trace file. In some embodiments, altering verbosity level may improve runtime performance.

In some embodiments, the traces may support 3 levels of verbosity:

| Verbosity Level | Trace Information |
|---|---|
| 1 | All important fields of the USB4 packets<br>All entry/exit to buffer operations of each packet in router<br>All write memory traces<br>All control operations |
| 2 | Includes all information from level 1<br>Protocol adapter payload<br>All packets dropped due to path disabled<br>Some intermediate packet scheduling steps<br>All memory read operations |
| 3 | Includes all information from level 1 and 2<br>All packet scheduling steps |

USB4 Trace File Example Use-cases:

In the following section, two use-cases of using USB4 traces in debug of USB4 subsystem data flow are discussed.

Figure 14:
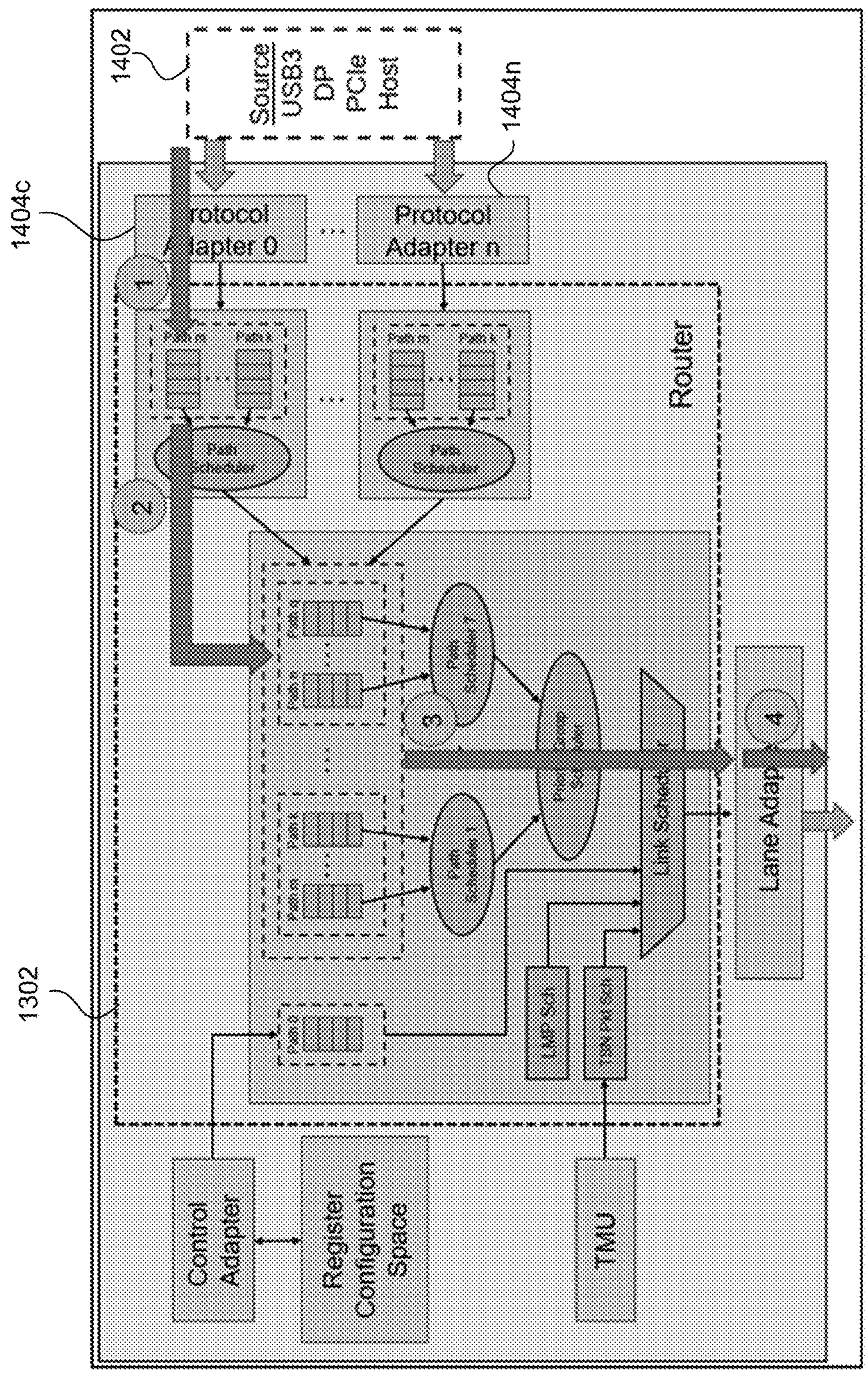
FIG. 14 illustrates a path of a protocol adapter packet, according to an embodiment of the present disclosure.

Tracking a packet originating from the protocol adapter to the USB4 physical lines:

FIG. 14 illustrates a path of a protocol adapter packet, according to an embodiment of the present disclosure. By way of a non-limiting example, in some embodiments, a USB3 packet with Header Sequence Number (HSN) 0 from the source protocol stack of USB3 to the USB4 physical lines may be tracked. As shown in FIG. 14, the following transformations may occur.

A USB3 packet from a source 1402, such as USB3, DP, PCIe, and Host, converted to a USB4 packet. FIG. 15 illustrates a protocol adapter trace for a USB3 packet to USB4 packet conversion, according to an embodiment of the present disclosure. As shown in FIG. 15, the protocol adapter trace 1500 may include a packet type field indicates HSN to be 0 and time the USB3 packet entered the adapter. Further, UID value may be used to track the packet in various trace files.

FIG. 16 illustrates ingress trace information, according to an embodiment of the present disclosure. Once the packet is scheduled in an ingress buffer of an adapter 1404 of a plurality of adapters 1404*a* through 1404*n*, the UID of the transaction shown in the ingress trace information 1600 may be used for tracking in the ingress trace. The ingress trace may provide information about the destination of the packet and the timing information of the packet's lifetime in the ingress direction.

FIG. 17 illustrates egress trace information, according to an embodiment of the present disclosure. Based on the routing information from the ingress trace, the packet may be tracked in the specific adapter's egress trace using the same UID value of the packet as shown in the egress trace information 1700. The packets scheduling priorities may be decoded and timing for transmission of the packet on the lane adapter may be scheduled.

FIG. 18 illustrates a lane adapter Tx trace, according to an embodiment of the present disclosure. As shown in FIG. 18, in the lane adapter Tx trace file 1800, the UID value may be used to identify the same packet and to extract the USB4 packet header specific information and the timing information on when the packet was transmitted on the physical lines.

Figure 19:
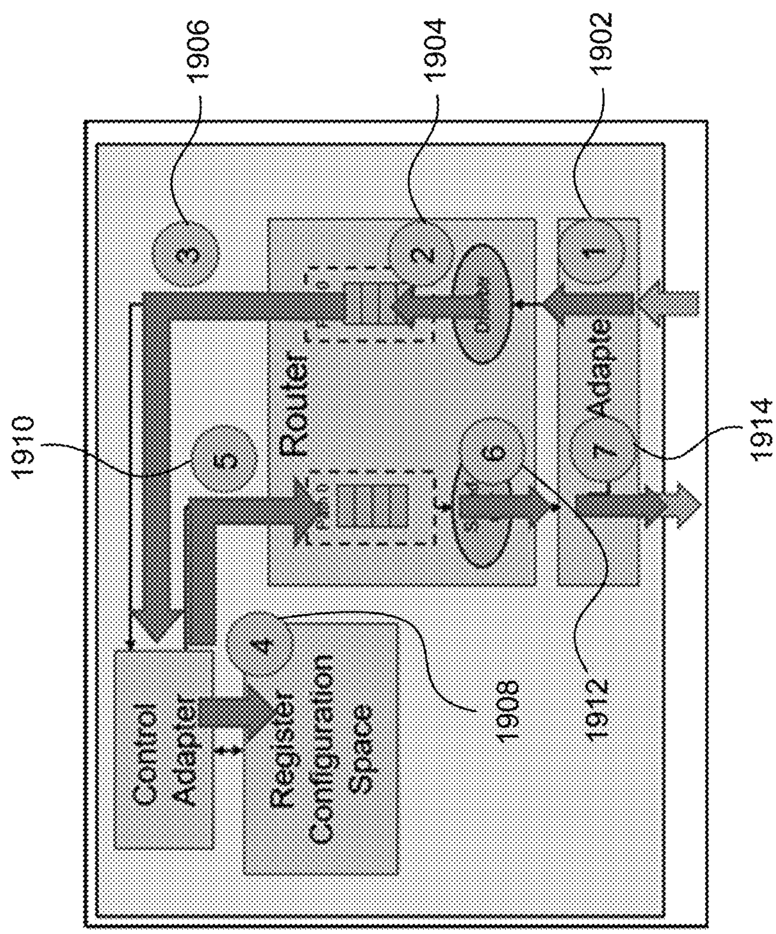
FIG. 19 illustrates a configuration write cycle in a device router, according to an embodiment of the present disclosure.

Tracking a configuration write cycle in device router:

FIG. 19 illustrates a Configuration Write Cycle in Device Router, according to an embodiment of the present disclosure. This use-case is to track a full configuration write cycle in a device router. As shown in FIG. 19, at 1902, a control configuration write packet received on a lane adapter and all the relevant packet details may be displayed in the lane adapter trace file display 2000, as shown in FIG. 20. The timing point signifies the time the transaction was seen on the physical lines. The UID of this transaction may be noted and tracked on the ingress trace of the lane adapter.

At 1904, the packet may arrive at the lane adapter's ingress path. In the lane adapter ingress trace 2100, as shown in FIG. 21, the packet may be seen as stored in the special path 0 queue for control port. The timing points record the lifetime of the packet in the ingress path.

At 1906, the same packet may be tracked using the UID value in the control adapter trace file 2200, as shown in FIG. 22. The write packet may be processed at the recorded timing point.

At 1908, the memory trace records the changes in memory due to the current transaction, which is tracked with UID, as shown in memory trace records 2300, as shown in FIG. 23.

At 1910, the control adapter, while processing the write request may generate a write response packet. As shown in FIG. 24, the egress queue 2400 of the lane adapter also records the timing point of response generation, and the UID of the causal write request. The packet may be queued in the egress queue of the lane adapter at path 0.

At 1912, using the UID recorded in the control port, the packet may be tracked in the egress trace 2500, as shown in FIG. 25. The lifetime of the packet and its scheduling steps may also be recorded in the egress trace.

Figure 26:
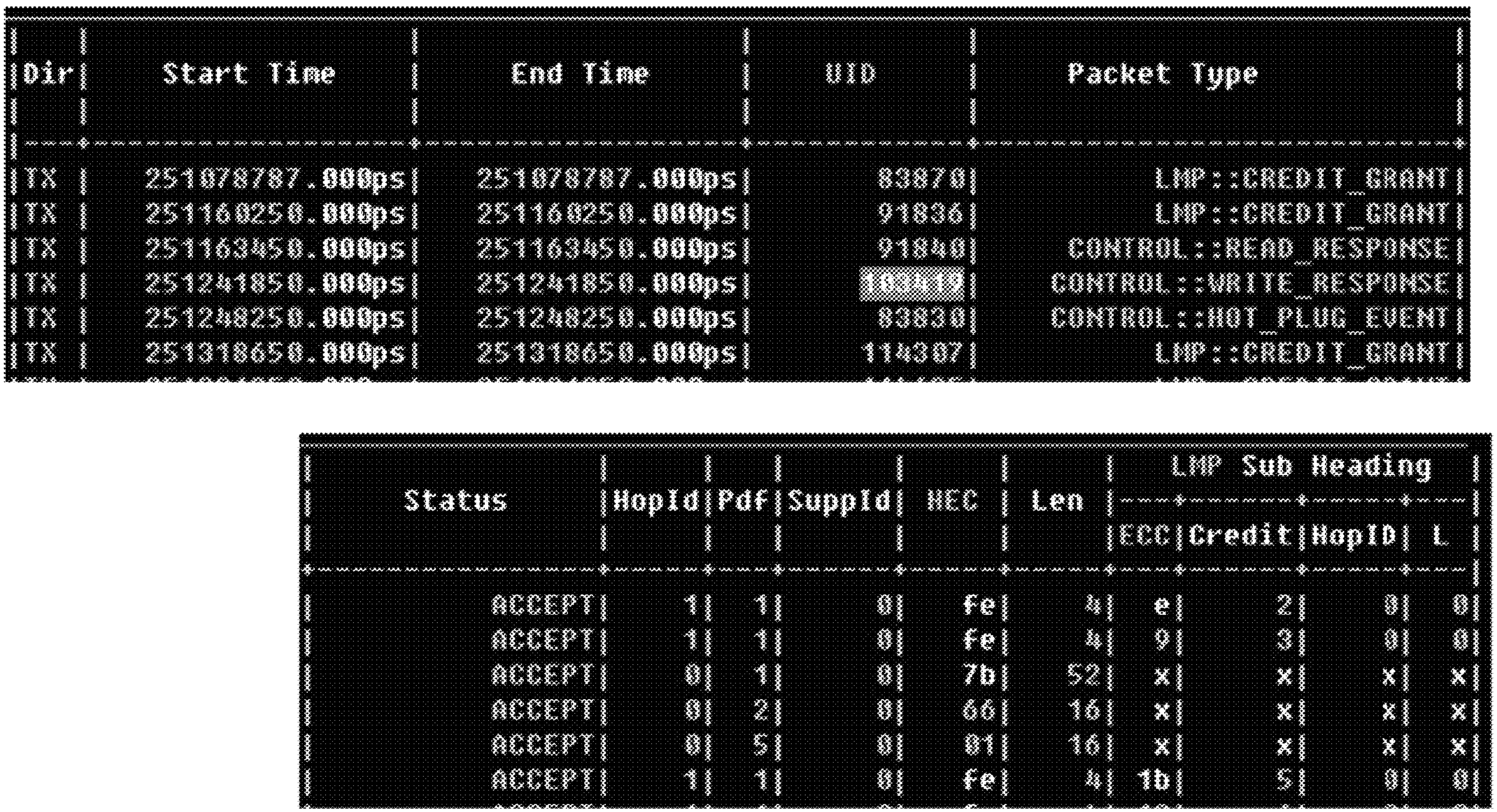
FIG. 26 illustrates a lane adapter Tx trace, according to an embodiment of the present disclosure.

At 1914, the packet may be traced in the lane adapter Tx trace based on the UID value, as shown in a lane adapter Tx trace 2600 of FIG. 26 to extract the USB4 packet header specific information and the timing information on when the packet was sent on the physical lines.

Figure 27:
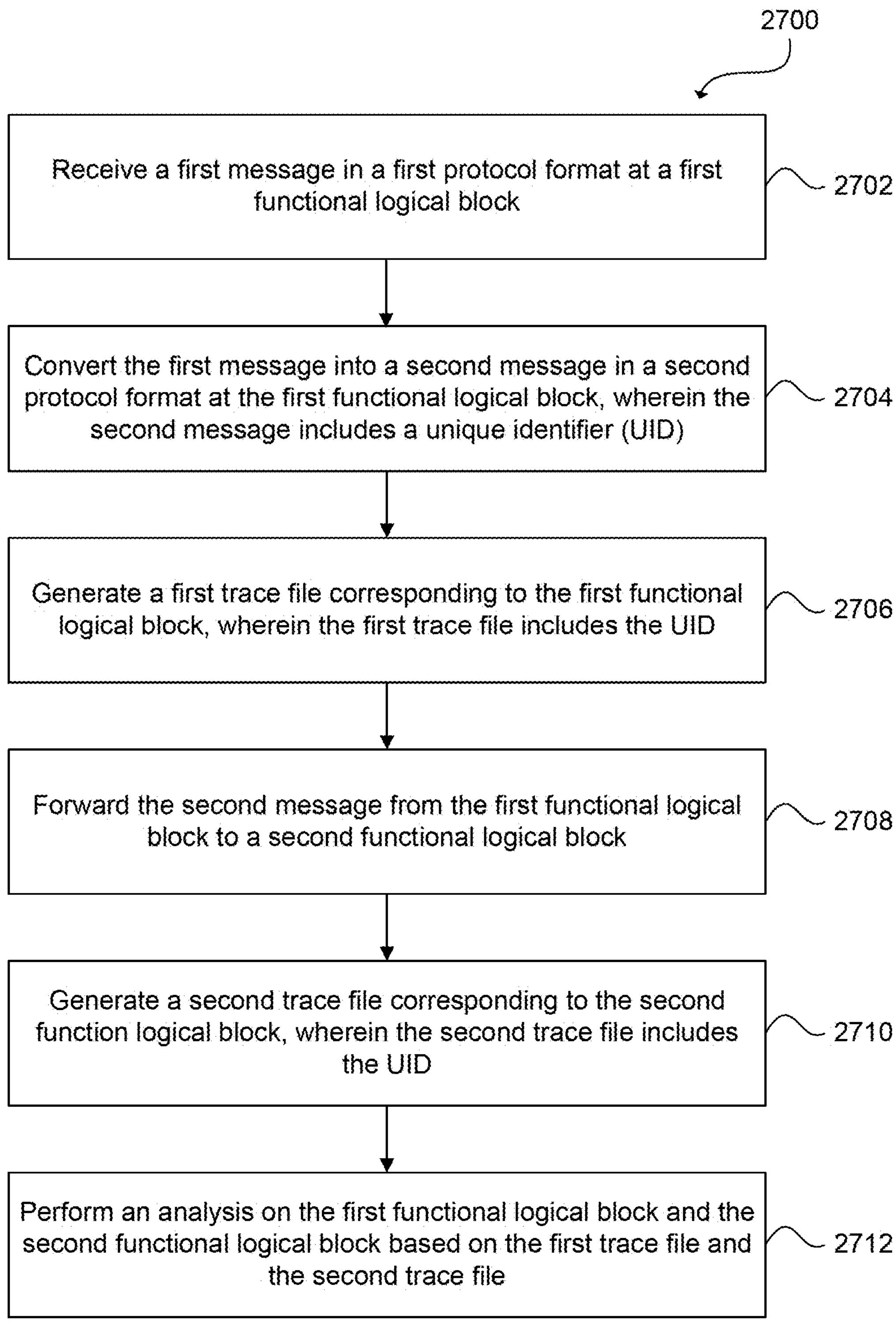
FIG. 27 illustrates a flowchart of a debug methodology for USB4 subsystem using UID approach, according to an embodiment of the present disclosure.

FIG. 27 illustrates an example debug methodology for USB4 subsystem using UID approach. FIG. 27 may be described with regard to elements of Method 2700 may be performed as part of the processes 2800 illustrated in FIG. 28. Method 2700 may be performed by the computer system 2900 of FIG. 29. Method 2700 is not limited to the specific aspects depicted in those figures, and other systems may be used to perform the method as will be understood by those skilled in the art. It is to be appreciated that not all operations may be needed, and the operations may not be performed in the same order as shown in FIG. 27.

At 2702, a first message is received at a first functional logical block, in some embodiments. In some embodiments, the first functional logical block may be a protocol adapter of a USB4 subsystem. The received first message may be in a first protocol format. According to some embodiments, the first received message may be a packet corresponding to a first protocol format. According to some embodiments, a first protocol format may correspond to USB3, PCIe, or DP.

At 2703, the first message is converted into a second message in a second protocol format at the first functional block. In some embodiments, the second message may be a USB4 packet. In some embodiments, the second protocol format may be a USB format. In some embodiments, the second message includes a unique identifier (UID). In some embodiments, a UVM standard function 'get-inst-id' may be called to return a numerical instance identifier which may be assigned to each USB4 packet as a unique identification number.

At 2706, a first trace file corresponding to the first functional logical block is generated. In some embodiments, the first functional logical block is a protocol adapter or a lane adapter of a USB4 subsystem. In some embodiments, the first trace file includes the UID corresponding to the second message. At, 2708, the second message is forwarded from the first functional logical block to a second functional logical block. In some embodiments, the second functional logical block may be one of a router ingress component, a control adapter, a register configuration space, or a link adapter component of a USB4 subsystem.

At 2710, a second trace file corresponding to the second functional logical block is generated. In some embodiment, the second trace file includes the UID corresponding to the second message. At 2712, an analysis is performed on the first functional logical block and the second functional logical. According to some embodiments, a debugging analysis may be performed on the first functional logical block and the second functional logical. In some embodiments, an analysis is performed on the first functional logical block and the second functional logical using the first trace file and the second trace file. In some embodiments, the UID corresponding to the USB4 packet is identified in the first trace file and the second trace file to perform debugging analysis.

Figure 28:
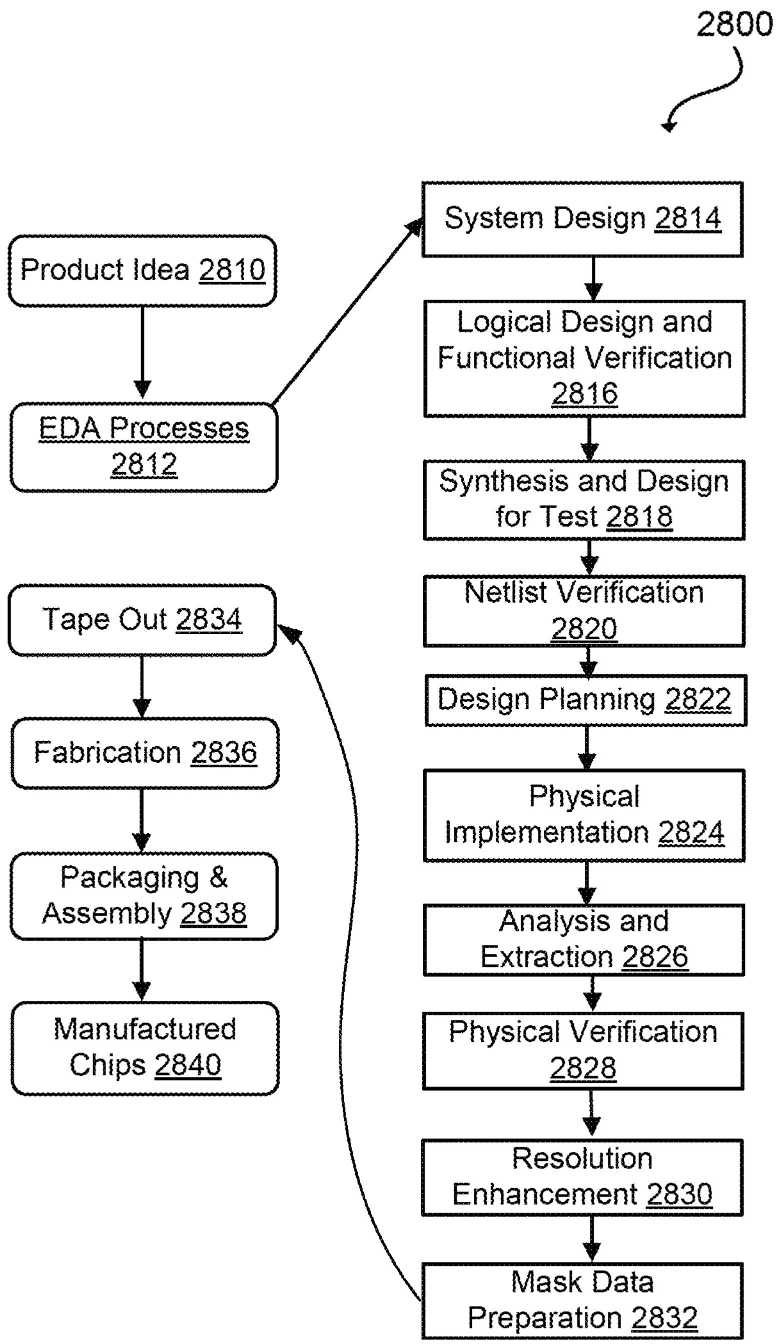
FIG. 28 illustrates a flowchart of various processes used during the design and fabrication of an integrated circuit, according to an embodiment of the present disclosure.

FIG. 28 illustrates an example set of processes 2800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 2810 with information supplied by a designer, information that is transformed to create an article of manufacture that uses a set of EDA processes 2812. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 2836, and packaging and assembly processes 2838 are performed to produce the finished integrated circuit 2840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 28. The processes described by being enabled by EDA products (or tools).

During system design 2814, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 2816, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 2818, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 2820, the netlist is checked for compliance with timing constraints and for correspondence with the HDL code. During design planning 2822, an overall floor plan for the integrated circuit is constructed and analyzed for timing and top-level routing.

During layout or physical implementation 2824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 2826, the circuit function is verified at the layout level, which permits refinement of the layout design. During physical verification 2828, the layout design is checked to ensure that manufacturing constraints are correct, such as DRC constraints, electrical constraints, lithographic constraints, and that circuitry function matches the HDL design specification. During resolution enhancement 2830, the geometry of the layout is transformed to improve how the circuit design is manufactured.

During tape-out, data is created to be used (after lithographic enhancements are applied if appropriate) for the production of lithography masks. During mask data preparation 2832, the 'tape-out' data is used to produce lithography masks that are used to produce finished integrated circuits.

A storage subsystem of a computer system (such as computer system 2800 of FIG. 28) may be used to store the programs and data structures that are used by some or all of the EDA products described herein, and products used for the development of cells for the library and for the physical and logical design that use the library.

Figure 29:
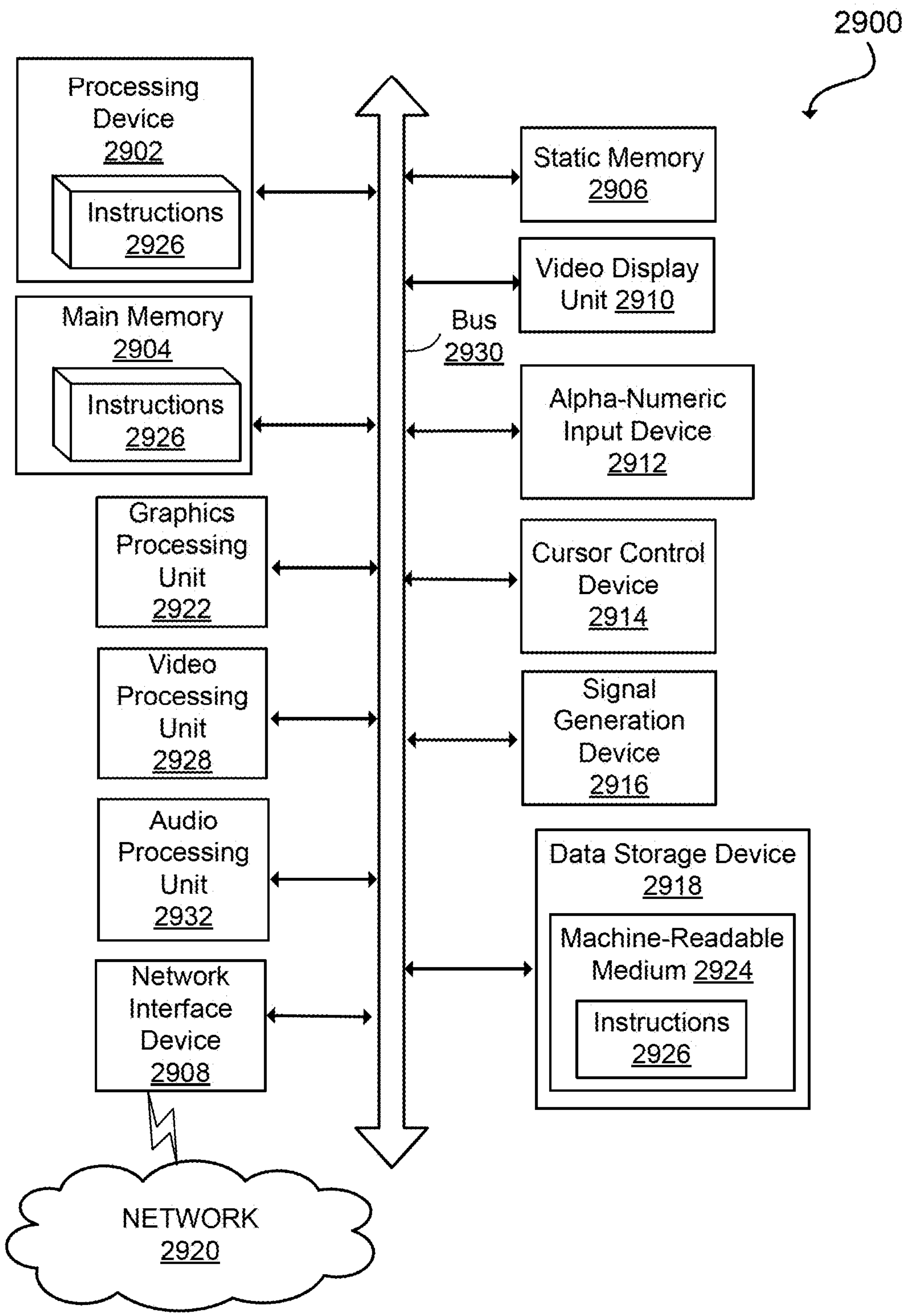
FIG. 29 illustrates an abstract diagram of an example computer system in which embodiments of the present disclosure may operate.

FIG. 29 illustrates an example machine of a computer system 2900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 2900 includes a processing device 2902, a main memory 2904 (e.g., read-only memory (ROM), flash memory, dynamic random access memory (DRAM) such as synchronous DRAM (SDRAM), a static memory 2906 (e.g., flash memory, static random access memory (SRAM), etc.), and a data storage device 2918, which communicate with each other via a bus 2930.

The processing device 2902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 2902 may also be one or more special-purpose processing devices such as an application-specific integrated circuit (ASIC), a field-programmable gate array (FPGA), a digital signal processor (DSP), network processor, or the like. The processing device 2902 may be configured to execute instructions 2926 for performing the operations and steps described herein.

The computer system 2900 may further include a network interface device 2908 to communicate over the network 2920. The computer system 2900 also may include a video display unit 2910 (e.g., a liquid crystal display (LCD) or a cathode ray tube (CRT)), an alphanumeric input device 2912 (e.g., a keyboard), a cursor control device 2914 (e.g., a mouse), a graphics processing unit 2922, a signal generation device 2916 (e.g., a speaker), graphics processing unit 2922, video processing unit 2929, and audio processing unit 2932.

The data storage device 2918 may include a machine-readable storage medium 2924 (also known as a non-transitory computer-readable medium) on which is stored one or more sets of instructions 2926 or software embodying any one or more of the methodologies or functions described herein. The instructions 2926 may also reside, completely or at least partially, within the main memory 2904 and/or within the processing device 2902 during execution thereof by the computer system 2900, the main memory 2904, and the processing device 2902 also constituting machine-readable storage media.

In some implementations, the instructions 2926 include instructions to implement functionality corresponding to the present disclosure. While the machine-readable storage medium 2924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 2902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method, comprising:

converting a first message in a first protocol format received at a first functional logical block of a plurality of functional logical blocks of an electronic subsystem of a host device into a second message in a second protocol format at the first functional logical block, wherein the second message is assigned a unique identifier (UID);

generating a first trace file corresponding to the first functional logical block, wherein the first trace file includes the UID assigned to the second message;

forwarding the second message from the first functional logical block to a second functional logical block of the plurality of functional logical blocks of the electronic subsystem of the host device;

generating a second trace file corresponding to the second functional logical block, wherein the second trace file includes the UID assigned to the second message; and performing a verification, by a processor, of a design of the first functional logical block and the second functional logical block of the electronic subsystem to determine an error on the second message based on the UID in the first trace file and the second trace file to debug the design of the first functional logical block and the second functional logical block.

2. The method of claim 1, wherein the first protocol format comprises one of a specification of universal serial bus (USB), display port (DP), and PCI Express (PCIe), and the second protocol format is another specification of USB.

3. The method of claim 2, wherein the specification of USB is USB3 and the other specification of USB is USB4.

4. The method of claim 1, further comprising generating the first trace file or the second trace file including timing information corresponding to an entry to and an exit from the first functional logical block or the second functional logical block.

5. The method of claim 1, wherein the first functional logical block is a protocol adapter, and the method further comprising converting, at the protocol adapter, a packet received in the first protocol format into the second protocol format.

6. The method of claim 1, wherein the second functional logical block is a router, and the method further comprising routing, by the router, a packet received at a lane adapter to a protocol adapter, and another packet received at the protocol adapter to the lane adapter.

7. The method of claim 1, further comprising analyzing, based on the UID, lifetime of a packet in the electronic subsystem.

8. A system, comprising:

a memory configured to store operations; and one or more processors configured to perform the operations, the operations comprising:

converting a first message in a first protocol format received at a first functional logical block of a plurality of functional logical blocks of an electronic subsystem of the system into a second message in a second protocol format at the first functional logical block, wherein the second message is assigned a unique identifier (UID);

generating a first trace file corresponding to the first functional logical block, wherein the first trace file includes the UID assigned to the second message;

forwarding the second message from the first functional logical block to a second functional logical block of the plurality of functional logical blocks of the electronic subsystem of the system;

generating a second trace file corresponding to the second functional logical block, wherein the second trace file includes the UID assigned to the second message; and performing a verification of a design of the first functional logical block and the second functional logical block of the electronic subsystem to determine an error on the second message based on the UID in the first trace file and the second trace file to debug the design of the first functional logical block and the second functional logical block.

9. The system of claim 8, wherein the first protocol format comprises one of a specification of universal serial bus (USB), display port (DP), and PCI Express (PCIe), and the second protocol format is another specification of USB.

10. The system of claim 8, wherein the operations further comprise generating the first trace file or the second trace file including timing information corresponding to an entry to and an exit from the first functional logical block or the second functional logical block.

11. The system of claim 8, wherein the first functional logical block is a protocol adapter, and the operations further comprise converting, at the protocol adapter, a packet received in the first protocol format into the second protocol format and vice versa.

12. The system of claim 8, wherein the second functional logical block is a router, and the operations further comprise routing, by the router, a packet received at a lane adapter to a protocol adapter, and another packet received at the protocol adapter to the lane adapter.

13. The system of claim 8, wherein the operations further comprise analyzing, based on the UID, lifetime of a packet in the electronic subsystem.

14. A non-transitory, tangible computer-readable device having instructions stored thereon that, when executed by at least one computing device, causes the at least one computing device to perform operations comprising:

converting a first message in a first protocol format received at a first functional logical block of a plurality of functional logical blocks of an electronic subsystem of the at least one computing device into a second message in a second protocol format at the first functional logical block, wherein the second message is assigned a unique identifier (UID);

generating a first trace file corresponding to the first functional logical block, wherein the first trace file includes the UID assigned to the second message;

forwarding the second message from the first functional logical block to a second functional logical block of the plurality of functional logical blocks of the electronic subsystem of the at least one computing device;

generating a second trace file corresponding to the second functional logical block, wherein the second trace file includes the UID assigned to the second message; and performing a verification of a design of the first functional logical block and the second functional logical block of the electronic subsystem to determine an error on the second message based on the UID in the first trace file and the second trace file to debug the design of the first functional logical block and the second functional logical block.

15. The non-transitory, tangible computer-readable device of claim 14, wherein the first protocol format comprises one of a specification of universal serial bus (USB), display port (DP), and PCI Express (PCIe), and the second protocol format is another specification of USB, and wherein the specification of USB is USB3 and the other specification of USB is USB4.

16. The non-transitory, tangible computer-readable device of claim 14, wherein the operations further comprise generating the first trace file or the second trace file including timing information corresponding to an entry to and an exit from the first functional logical block or the second functional logical block.

17. The non-transitory, tangible computer-readable device of claim 14, wherein the first functional logical block is a protocol adapter, and the operations further comprise converting, at the protocol adapter, a packet received in the first protocol format into the second protocol format and vice versa.

18. The non-transitory, tangible computer-readable device of claim 14, wherein the second functional logical block is a router, and the operations further comprise routing, by the router, a packet received at a lane adapter to a protocol adapter, and another packet received at the protocol adapter to the lane adapter.

19. The non-transitory, tangible computer-readable device of claim 14, wherein the operations further comprise analyzing, based on the UID, lifetime of a packet in the electronic subsystem.

20. The method of claim 1, wherein performing the verification further comprises providing debugging analysis of one or more of the first functional logical block and the second functional logical block using the UID.

* * * * *